US012775716B2

(12) United States Patent
Gorog

(10) Patent No.: US 12,775,716 B2
(45) **Date of Patent: *Oct. 27, 2026**

(54) CRYPTOGRAPHIC TRUST ENABLED DEVICES OF CYBERSECURITY SYSTEMS

(71) Applicant: BlockFrame, Inc., Colorado Springs, CO (US)

(72) Inventor: Christopher Paul Gorog, Pueblo, CO (US)

(73) Assignee: BlockFrame, Inc., Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/731,514

(22) Filed: Jun. 3, 2024

(65) Prior Publication Data

US 2024/0330487 A1 Oct. 3, 2024

Related U.S. Application Data

(63) Continuation of application No. 17/488,529, filed on Sep. 29, 2021, now Pat. No. 12,045,355.
(Continued)

(51) Int. Cl.
*G06F 21/60* (2013.01)
*G06F 16/23* (2019.01)
(Continued)

(52) U.S. Cl.
CPC ........ *G06F 21/602* (2013.01); *G06F 16/2379* (2019.01); *G06F 21/604* (2013.01);
(Continued)

(58) Field of Classification Search
CPC .............................. G06F 21/604; H04L 9/0827
See application file for complete search history.

(56) References Cited

U.S. PATENT DOCUMENTS 9,887,975 B1 2/2018 Gifford
10,783,590 B1 9/2020 Zhou
(Continued)

FOREIGN PATENT DOCUMENTS

CA 3061603 A1 5/2020
CN 107409002 A 11/2017
(Continued)

OTHER PUBLICATIONS

PCT Notification of Transmittal of the International Search Report and the Written Opinion of the International Searching Authority for PCT Application No. PCT/US21/52854, mailed Dec. 29, 2021.
(Continued)

*Primary Examiner* — David J Pearson
(74) *Attorney, Agent, or Firm* — Lowenstein Sandler LLP

(57) ABSTRACT

A system includes a memory, and at least one processor, operatively coupled to the memory, to receive an encrypted version of a first set of secrets data corresponding to a target supply chain state of a device, receive a permission to cause a transition to the target supply chain state, and in response to receiving the permission to cause the transition to the target supply chain state, cause the transition to the target supply chain state. To cause the transition to the target supply chain state, the at least one processor is to cause the first set of secrets data to be stored in a protected memory.

20 Claims, 9 Drawing Sheets

Related U.S. Application Data

(60) Provisional application No. 63/123,067, filed on Dec. 9, 2020, provisional application No. 63/086,928, filed on Oct. 2, 2020, provisional application No. 63/086,904, filed on Oct. 2, 2020, provisional application No. 63/086,925, filed on Oct. 2, 2020, provisional application No. 63/086,926, filed on Oct. 2, 2020.

(51) Int. Cl.

| | |
|---|---|
| ***G06F 21/62*** | (2013.01) |
| ***G06Q 10/0835*** | (2023.01) |
| ***G06Q 10/087*** | (2023.01) |
| ***G06Q 20/38*** | (2012.01) |
| ***G06Q 20/40*** | (2012.01) |
| ***H04L 9/08*** | (2006.01) |
| ***H04L 9/40*** | (2022.01) |

(52) U.S. Cl.

CPC ..... *G06F 21/6209* (2013.01); *G06Q 10/0835* (2013.01); *G06Q 10/087* (2013.01); *G06Q 20/389* (2013.01); *G06Q 20/401* (2013.01); *H04L 9/0827* (2013.01); *H04L 9/085* (2013.01); *H04L 9/0861* (2013.01); *H04L 9/0877* (2013.01); *H04L 63/0442* (2013.01); *H04L 63/0823* (2013.01); *H04L 63/0838* (2013.01)

(56) References Cited

U.S. PATENT DOCUMENTS

| | | | |
|---|---|---|---|
| 11,138,602 B2 | 10/2021 | Lu | |
| 11,232,221 B2 | 1/2022 | Novotny | |
| 11,310,311 B2 | 4/2022 | Shrinivasan | |
| 12,045,355 B2 * | 7/2024 | Gorog | H04L 9/3263 |
| 2010/0125670 A1 | 5/2010 | Dondeti | |
| 2013/0151317 A1 | 6/2013 | Charfi | |
| 2014/0093074 A1 | 4/2014 | Gotze | |
| 2016/0078208 A1 | 3/2016 | Namiki | |
| 2016/0352733 A1 | 12/2016 | Oxford | |
| 2016/0366111 A1 | 12/2016 | Smith | |
| 2016/0380769 A1 | 12/2016 | Bar | |
| 2017/0083724 A1 | 3/2017 | Chhabra | |
| 2018/0041484 A1 | 2/2018 | Gifford | |
| 2018/0130158 A1 | 5/2018 | Atkinson | |
| 2018/0198604 A1 | 7/2018 | Hayton | |
| 2018/0254898 A1 | 9/2018 | Sprague | |
| 2018/0262493 A1 | 9/2018 | Andrade | |
| 2018/0316492 A1 | 11/2018 | Ramachandran | |
| 2019/0132410 A1 | 5/2019 | Kuzkin | |
| 2019/0164137 A1 | 5/2019 | Vincent | |
| 2019/0173884 A1 | 6/2019 | Vincent | |
| 2019/0349346 A1 | 11/2019 | Curtis | |
| 2019/0349426 A1 | 11/2019 | Smith | |
| 2019/0354968 A1 | 11/2019 | Sato | |
| 2019/0370250 A1 | 12/2019 | Tipton | |
| 2020/0067907 A1 | 2/2020 | Avetisov | |
| 2020/0074415 A1 | 3/2020 | Jayaram | |
| 2020/0097927 A1 | 3/2020 | Groarke | |
| 2020/0099532 A1 | 3/2020 | Goldman | |
| 2020/0119904 A1 | 4/2020 | Philyaw | |
| 2020/0120079 A1 | 4/2020 | Callaghan | |
| 2020/0142979 A1 | 5/2020 | Nakamura | |
| 2020/0242249 A1 | 7/2020 | Kumar | |
| 2020/0320207 A1 | 10/2020 | Beno | |
| 2020/0403805 A1 | 12/2020 | Steele | |
| 2021/0081557 A1 | 3/2021 | Thomson-Wood | |
| 2021/0382831 A1 | 12/2021 | Sun | |

FOREIGN PATENT DOCUMENTS

| | | |
|---|---|---|
| CN | 108389046 A | 8/2018 |
| CN | 110245956 A | 9/2019 |
| CN | 110463161 A | 11/2019 |
| EP | 3312756 A1 | 4/2018 |
| WO | 2019081919 A1 | 5/2019 |
| WO | 2019175878 A1 | 9/2019 |
| WO | 2020001996 A1 | 1/2020 |
| WO | 2020091789 A1 | 5/2020 |
| WO | 2022016280 A1 | 1/2022 |

OTHER PUBLICATIONS

PCT Notification Concerning Transmittal of International Preliminary Report on Patentability for PCT Application No. PCT/US2021/052854, mailed Apr. 13, 2023, 6 pages.

PCT Notification of Transmittal of the International Search Report and the Written Opinion of the International Searching Authority for PCT Application No. PCT/US21/52865, mailed Dec. 28, 2021.

PCT Notification Concerning Transmittal of International Preliminary Report on Patentability for PCT Application No. PCT/US2021/052865, mailed Apr. 13, 2023, 11 pages.

PCT Notification of Transmittal of the International Search Report and the Written Opinion of the International Searching Authority for PCT Application No. PCT/US21/52839, mailed Jan. 11, 2022.

PCT Notification Concerning Transmittal of International Preliminary Report on Patentability for PCT Application No. PCT/US2021/052839, mailed Apr. 13, 2023, 10 pages.

PCT Notification of Transmittal of the International Search Report and the Written Opinion of the International Searching Authority for PCT Application No. PCT/US21/52872, mailed Jan. 12, 2022.

PCT Notification Concerning Transmittal of International Preliminary Report On Patentability for PCT Application No. PCT/US2021/052872, mailed Apr. 13, 2023, 9 pages.

Skudlarek et al. "A Platform Solution for Secure Supply-Chain and Chip Life-Cycle" Computer, vol. 49, No. 8, pp. 28-34, Aug. 2016 (Year: 2016).

Notice of First Office Action issued on Mar. 28, 2024 for CN Application No. 202180079374.5, 12 pages.

The extended European search for EP Application No. EP21876474.4, dated May 14, 2024, 11 pages.

Interdigital et al: "pCR to TR 33.sso Section 8", 3GPP Draft; S3-110649 33 SSO Section X AKA Solution R3 IDCC, 3rd Generation Partnership Project (3GPP), Mobile Competence Centre ; 650, Route Des Lucioles ; F-06921 Sophia-Antipolis Cedex ; France, vol. SA WG3, No. Mainz; Jul. 11, 2011, Jul. 4, 2011 (Jul. 4, 2011), XP050550044, [retrieved on Jul. 4, 2011] * Chapter 1: "Introduction".

SG Search Report for Application No. 10202401066R, dated Dec. 30, 2024, 2 pages.

* cited by examiner

CRYPTOGRAPHIC TRUST ENABLED DEVICES OF CYBERSECURITY SYSTEMS

CROSS-REFERENCE TO RELATED APPLICATIONS

The present application is a continuation of U.S. patent application Ser. No. 17/488,529, filed on Sep. 29, 2021 and entitled "CRYPTOGRAPHIC TRUST ENABLED DEVICES OF CYBERSECURITY SYSTEMS", which claims priority to U.S. Provisional Patent Application No. 63/086,904, filed on Oct. 2, 2020 and entitled "BLOCK-CHAIN SYNCHRONOUS TRUST CONSENSUS MODEL," U.S. Provisional Patent Application No. 63/086,925, filed on Oct. 2, 2020 and entitled "SECURITY MANAGEMENT FRAMEWORK FOR SUPPLY CHAIN FOR ENERGY DELIVERY SYSTEMS," U.S. Provisional Patent Application No. 63/086,926, filed on Oct. 2, 2020 and entitled "ADVANCED SECURITY MODEL BASED ON HYBRID BLOCKCHAIN AND CRYPTOGRAPHIC TRUST CHAIN ARCHITECTURE," U.S. Provisional Patent Application No. 63/086,928, filed on Oct. 2, 2020 and entitled "OPERATIONS AND USAGE OF CTC AND EMBEDDED LIBRARIES FOR ENABLING ADVANCED SECURITY MODEL," and U.S. Provisional Patent Application No. 63/123,067, filed on Dec. 9, 2020 and entitled "CYBER SECURITY ECOSYSTEM FOR SUPPLY CHAIN ORGANIZATION," which are hereby incorporated by reference herein in their entirety for all purposes.

TECHNICAL FIELD

Embodiments of the disclosure relate generally to cybersecurity, and more specifically, relate to cryptographic trust enabled devices of cybersecurity systems.

BACKGROUND

The Internet of Things (IoT) refers to a network of physical objects or devices ("things") that are capable of communicating with each other and/or with other IoT devices over the Internet. Industrial IoT (IIoT) devices can receive and analyze data received from connected equipment, operational technology, etc. to monitor and/or control industrial systems. An industrial control system (ICS) is an integrated hardware/software system that controls the operation of equipment (e.g., machines) within an environment.

SUMMARY

In some embodiments, a system is provided. The system includes a memory, and at least one processor, operatively coupled to the memory, to receive an encrypted version of a first set of secrets data corresponding to a target supply chain state of a device, receive a permission to cause a transition to the target supply chain state, and in response to receiving the permission to cause the transition to the target supply chain state, cause the transition to the target supply chain state. To cause the transition to the target supply chain state, the at least one processor is to cause the first set of secrets data to be stored in a protected memory.

In some embodiments, a method is provided. The method includes receiving an encrypted version of a first set of secrets data corresponding to a target supply chain state of a device, receiving a permission to cause a transition to the target supply chain state, and in response to receiving the permission to cause the transition to the target supply chain state, causing the transition to the target supply chain state. Causing the transition to the target supply chain state includes causing the first set of secrets data to be stored in a protected memory.

In some embodiments, a non-transitory computer-readable storage medium is provided. The non-transitory computer-readable storage medium includes instructions that, when executed by a processing device, cause the processing device to perform operations including receiving an encrypted version of a first set of secrets data corresponding to a target supply chain state of a device, receiving a permission to cause a transition to the target supply chain state, and in response to receiving the permission to cause the transition to the target supply chain state, causing the transition to the target supply chain state. Causing the transition to the target supply chain state includes causing the first set of secrets data to be stored in a protected memory, and cryptographically sealing a second set of secrets data maintained in the protected memory. The second set of secrets data corresponds to a previous supply chain state of the device.

Numerous other aspects and features are provided in accordance with these and other embodiments of the disclosure. Other features and aspects of embodiments of the disclosure will become more fully apparent from the following detailed description, the claims, and the accompanying drawings.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
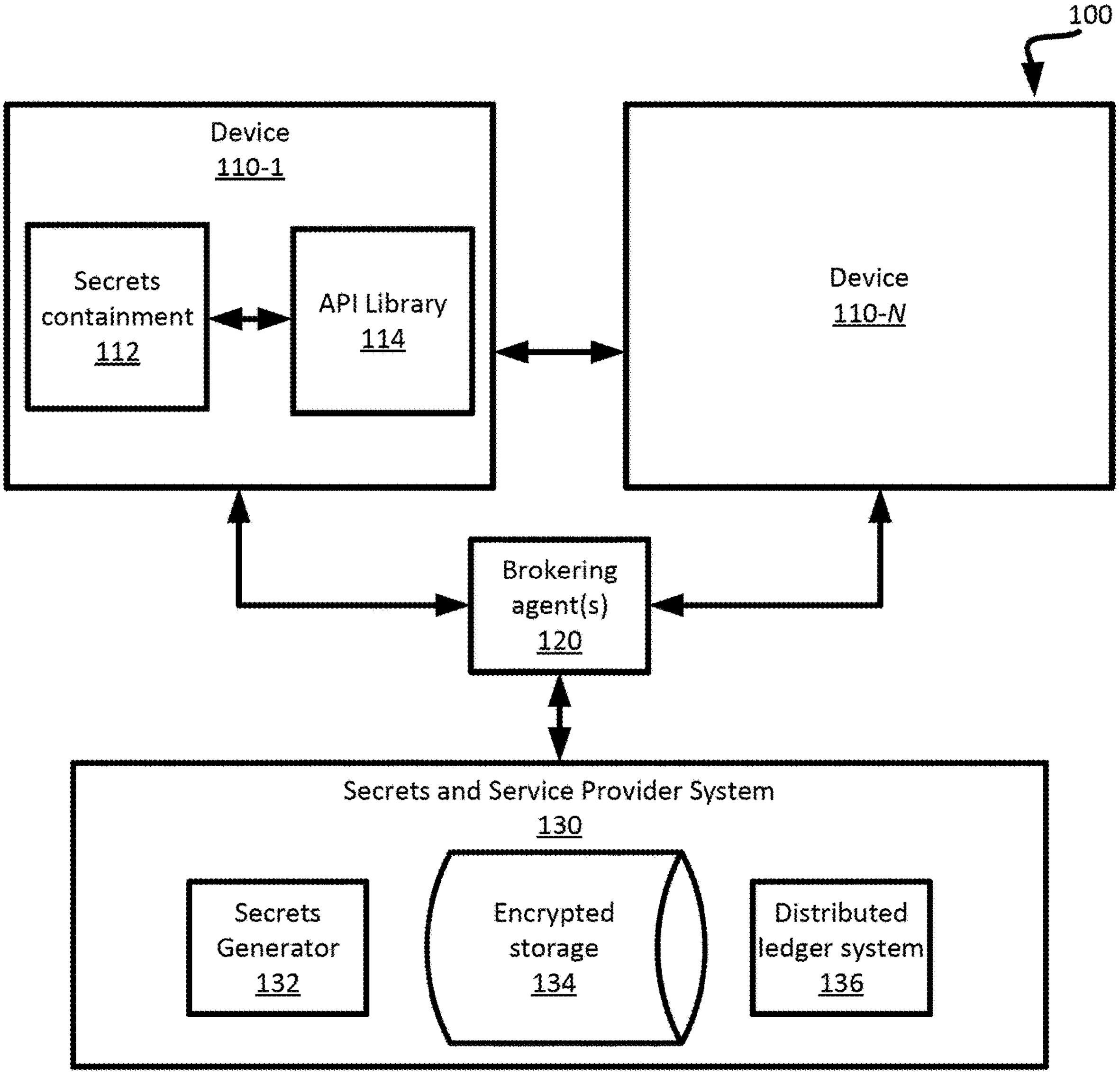
FIG. 1 is a block diagram of an example cybersecurity system, in accordance with some embodiments of the present disclosure.

Aspects of the present disclosure are directed to cryptographic trust devices for enabling cybersecurity features. The modern supply chain may be dependent on trustworthy connections that render the Internet interoperable. However, a major challenge of the Internet today is ensuring trust among the various entities interacting within a system. Certain solutions for establishing trust among entities are generally bandage-like solutions and may not provide adequate protection. A network (e.g., industrial network) may not provide sufficient underlying trust in each device within the industrial network. For example, with respect to Internet of Things (IoT) devices, a uniform way does not exist to secure, identify and/or manage such IoT devices as the IoT devices are transferred among various entities throughout the supply chain lifecycle. An IoT device herein refers to an object that is embedded with technology (e.g., sensors, software) to connect and exchange information with other devices and/or systems over a communication network (e.g., Internet). Examples of IoT devices include smartphones, wearable devices (e.g., smartwatches, fitness trackers and medical sensors), voice-controlled digital assistants, etc.

Aspects of the present disclosure address the above and other deficiencies by implementing cryptographic trust enabled devices within cybersecurity systems. A cryptographic trust enabled device is also referred to as a device. In some embodiments, the device is an IoT device. The device can be included within a system that communicates with one or more other devices and/or one or more secrets and service provider systems.

The device can maintain a set of cryptographic secrets ("secrets data") on protected memory of a secrets containment component while the device is in a particular device state ("state"). The set of secrets data can include a number of secrets components that enable the device to perform a variety of cryptographic functions while the device is in the particular state. For example, the set of secrets data can include a cryptographic key management block including a set of cryptographic key data for the particular state. In some embodiments, the set of secrets data is provided as a non-fungible token (NFT). To provide an extra layer of encryption, each of the secrets components can themselves be independently and uniquely encrypted by a respective cryptographic key, and then the entire set of secrets data can be encrypted (e.g., wrapped) to obtain the encrypted version of the set of secrets data. The encrypted version of the set of secrets data can then be ready for transport and storage on a distributed ledger linked to a brokering agent. The secrets and service provider system can generate a set of secrets data, encrypt the set of secrets data to obtain an encrypted version of the set of secrets data, and maintain the encrypted version of the set of secrets data on encrypted storage.

The state can correspond to a certain segment of a supply chain in which the device is present. Examples of states include a manufacturer provisioning state in which the device is in possession of a manufacturer, a vendor provisioning state in which the device is in possession of a vendor, an end-use provisioning state in which the device is allocated to at least one end-use segment (e.g., within a network or as a standalone device that uses the end-use provisioning state for communication to resources), and an operational state in which the device is presently operating or functioning within the network. A vendor refers to an entity that can assemble, program and/or handle the physical disposition of a device. Each state can be used to control the insertion and visibility of a corresponding set of secrets data onto the device. For example, the device can maintain a set of vendor provisioning secrets data on protected memory while in the vendor provisioning state to enable the device to perform cryptographic functionality pertaining to the vendor provisioning state, but would be unable to access the set of vendor provisioning secrets data while in the manufacturer provisioning state.

From time to time, as the device progresses throughout the supply chain, the possession of the device may be transferred between entities. To securely provision secrets at each stage of the supply chain as possession/ownership is transferred, the device can participate in a state transition process to transition from a first state to a second state (e.g., to elevate the device from a current state to a subsequent state, or revert the device from the current state to a previous state). The state transition process is a cryptographically secure process that enables the device to insert a set of secrets data for the desired state into the secrets containment component. The device can maintain a state machine that stores the state of the device and thus keeps track of which secrets have been provisioned/inserted onto the device. For example, the state machine can be maintained on the secrets containment component. If any segment of the state transitioning process fails, the device can revert back to the first state and another request will need to be made to transition to the second state.

The device can interact with the secrets and service provider system to receive the set of secrets data during the state transition. To further ensure data integrity and security during the state transition process, a brokering agent can be employed to broker the operations performed between the device and the secrets and service provider system. The brokering agent is a verified trusted entity (e.g., third-party entity) that functions as a proxy between the device and the secrets and service provider system to support cryptographically secure communications via a three-way handshake between the brokering agent, the device and the secrets and service provider system. More specifically, the brokering agent can service a request to the secrets and service provider system for providing the encrypted version of the set of secrets data for the state transition, the brokering agent can forward the encrypted version of the set of secrets data for decryption and storage on protected memory at the device. There can be a number of separate brokering agents that are each responsible for a device while in a particular state. For example, there can be a manufacturing brokering agent, a vendor brokering agent, an end-use brokering agent, etc. To protect other sets of secrets data from extraction after a state transition, the device can cryptographically seal ("seal") the previous set of secrets data corresponding to the previous state by encrypting the previous set of secrets data with a particular encryption key so that it is not obtainable by the entity now in possession of the device. Alternatively, the previous set of secrets data can be deleted after a successful state transition. Accordingly, risk for handling of secrets data at each stage within the supply chain can be deferred to entities that are able to handle and offset such risk, which can enable distributed manufacturing in regions where subcontractors may not be trusted to handle secrets and/or software/firmware components.

Advantages of the present disclosure include, but are not limited to, uniform secrets provisioning on IoT devices, uniform formatting for cryptographic functions across multiple devices, uniform resetting and/or refactoring of security by deriving and re-provisioning secrets, and improved cybersecurity.

FIG. 1 is a block diagram of an example cybersecurity system ("system") 100 for in accordance with some embodiments of the present disclosure. In some embodiments, the system 100 is an IoT and/or ICS system. As will be described in further detail, the system 100 can implement cybersecurity functionality, including producing uniform security features, synchronize supply chain assets globally, enable cross-industry support, relate processes and visibility of business operations, uniquely link data to sources, enabling tracking and confidential access, etc. All devices in a given network segment (for example, a section of smart grid or the computers in a single business) can contain a shared network secret. The shared network secret can be leveraged to generate symmetric keys synchronized across the network, which are in turn used for encryption and message authentication.

As shown, the system 100 can include a number of distributed cryptographic enabled trust devices ("devices") 110-1 through 110-N, set of brokering agents 120, and at least one secrets and service provider system 130. In some embodiments, the devices 110-1 through 110-N include IoT devices and the system 100 can be an IoT system. As will be described in further detail herein, the system 100 can be used to implement supply chain trust management with respect to the devices 110-1 through 110-N. That is, the system 100 can provide "Supply Chain Consumption as a Service" including cryptographic key management to provide separation of functional implementation of private secret programming with respect to each level of the supply chain. For example, the cryptographic key management block for a device can support trust progression throughout the entire lifecycle of the device in a supply chain by supporting cascading trust across all entities (e.g., organizations, companies and/or individuals) which handle manufacturing, vendor, end-use, operations, and end of life (EOL) stages for a device. Each stage of the supply chain (e.g., manufacturing, vendor, end-use, operational, and end-of-life) can correspond to a state of the chip.

Each of the devices 110-1 through 110-N can include a secrets containment component to process and maintain secrets data, and an application programming interface (API) library for implementing API methods for establishing cryptographic secure communications with other entities within the system 100. For example, the device 110-1 includes a secrets containment component 112 and an API library 114. The secrets containment component 112 can include a cryptographically-protected memory. The cryptographically-protected memory can be located on a protected integrated circuit, such as a hardened System-on-Chip (SoC), a secure microprocessor, etc.

For example, with respect to the device 110-1, the set of secrets data can correspond to some state of the device 110-1. In some embodiments, the set of secrets data is includes a non-fungible token (NFT). More specifically, the state can correspond to a certain segment of a supply chain in which the device is present. Examples of states include a manufacturer provisioning state, a vendor provisioning state, an end-use provisioning state, and an operational state. Each state can be used to control the insertion of a corresponding set of secrets data onto the device, such that the insertion of the set of secrets data for a particular state places the device in the particular state.

The set of secrets data can include a cryptographic key management block including a number of cryptographic key components to perform a cryptographic function while in the particular state. Cryptographic key management generally refers to the handling, protection, canceling/revocation, transporting or logistical coordination of the cryptographic keys. For example, the device can maintain a set of vendor provisioning secrets data in protected memory while in the vendor provisioning state, but would be unable to access the set of vendor provisioning secrets data while in the manufacturer provisioning state. Each of the devices 110-1 through 110-N can maintain a state machine that can track state progressions of the device, which can enable the provisioning of the device with the appropriate set of components for the particular state. Further details regarding the cryptographic key management block will be described below with reference to FIG. 2.

The secrets and service provider system 130 is a service that can securely generate and maintain sets of secrets data to be inserted onto at least one of the devices 110-1 through 110-N. For example, the secrets and service provider system 130 can include a secrets generator 132, encrypted storage 134, and a distributed ledger system 136. The secrets generator 132 can securely generate an encrypted version of a set of secrets data, and securely store the encrypted version of the set of secrets of data in the encrypted storage 134 so that it is never obtainable or visible for interception by outside entities. To provide an extra layer of encryption, each of the components of the set of secrets can themselves be independently and uniquely encrypted by a respective cryptographic key, and then the entire set of secrets can be encrypted to obtain the encrypted set of secrets. The secrets generator 132 can be embodied as hardware and/or software. In some embodiments, the secrets generator 132 is embodied as a hardware security module (HSM). An HSM is a tamper-resistant computing device that can securely generate and/or manage secrets data (e.g., cryptographic keys).

More specifically, a set of secrets data can be generated from a first set of data. The first set of data can include secret data of the secrets and service provider system, public data (e.g., public information provided by a brokering agent), secret device-specific data (e.g., secret device-specific information provided by a brokering agent), and secret organizational data (e.g., secret organization information provided by a brokering agent). For example, the public data, secret device-specific data and/or the secret organization data can be provided via a user interface (e.g., a webpage, a handheld device, a mobile device application). Each type of data can be obfuscated and encapsulated to be verifiable on insertion, and each type of data can be independently and uniquely encrypted by a secrets generator of the secrets and service provider system to generate the set of secrets data. The set of secrets data can then be encrypted by the secrets generator, using a second set of data derived from the secrets generator, to obtain the encrypted version of the set of secrets data. The encrypted version of the set of secrets data can then be ready for transport and storage on a distributed ledger linked to a brokering agent.

The secrets and service provider system 130 can be used as part of a process to control the provisioning/insertion of sets of secrets data onto the devices 110-1 through 110-N in a manner that maintains data integrity and trust. Provisioning is the process of requesting and inserting data into a device (or emulator). The provisioned set of secrets data can be used to implement cryptographic functionality, as will be described in further detail below. For example, the set of secrets data can include at least one of a cryptographic key for performing encryption during a cryptographic function, a digital certificate for proving ownership of a public key during a cryptographic function, etc. Illustratively assume that device 110-1 is presently in a first state corresponding to a first segment of the supply chain, but the device 110-1 is now in a second segment of the supply chain. The device 110-1 can then undergo a state transition process to transition the device 110-1 to a second state corresponding to the second segment of the supply chain (e.g., to elevate the device from a current state to a subsequent state, or revert the device from the current state to a previous state). The state transition process is a cryptographically secure process that grants the device 110-1 access to the second set of secrets data. For example, the first state can be a manufacturer provisioning state and the second state can be a vendor provisioning state. As another example, the first state can be the vendor provisioning state and the second state can be an end-use provisioning state. As another example, the first state can be the end-use provisioning state and the second state can be an operational state. However, such examples should not be considered limiting.

For example, during a manufacturing stage of the supply chain for the device 110-1, the device 110-1 can be initially programmed by a corresponding manufacturer to securely manage the cryptographic keys in the device. More specifically, the device 110-1 can have a unique manufacturer-assigned identifier that enables tracking of the device throughout the supply chain. The identification scheme used by a manufacturer can be maintained as a private manufacturer secret to prevent cyber-attacks within the system 100. During the vendor stage of the supply chain, the device 110-1 can then be transferred between one or more vendors. During the end-use state of the supply chain, the device 110-1 can be assigned to one or more end-use segments. During the operation state of the supply chain, the device 110-1 can be placed into an operational state.

To undergo the state transition process, the device 110-1 can receive the encrypted version of the set of secrets data for the second state from the secrets and service provider system 130, and transition to the second state upon receipt of the encrypted version of the set of secrets data. To provide a layer of cryptographic security, the device 110-1 and the secrets and service provider system 130 are not placed in direct communication. To enable such indirect communication, a brokering agent of the set of brokering agents 120 can be employed to securely broker the transaction between the device 110-1 and the secrets and service provider system 130. The set of brokering agents 120 can include a number of separate brokering agents that are each responsible for a device. For example, there can be a manufacturing brokering agent, a vendor brokering agent, an end-use brokering agent, etc. Each brokering agent is a certified third party entity that functions as a broker or proxy between the device 110-1 and the secrets and service provider system 130 to support cryptographically secure communications via a three-way handshake between the brokering agent 120, the device 110-1 and the secrets and service provider system 130. For example, a brokering agent of the set of brokering agents 120 can be included as a web service. A brokering agent of the set of brokering agents 120 can be licensed to a third-party within the system 100 to provide individualized brokering services within the system 100.

For example, the brokering agent can issue a request to the secrets and service provider system 130, on behalf of the device 110-1, to transition the device to the second state (e.g., elevate to or revert back to the second state). In response, the secrets and service provider system 130 can issue a challenge package to the brokering agent in order to authenticate the brokering agent as being a valid brokering agent to handle the request on behalf of the device. For example, the challenge can be based on an internal secret of the device 110-1 that only an authorized entity, such as the brokering agent, would have knowledge of. The brokering agent can provide a response back to the secrets and service provider system 130. If the response does not authenticate the brokering agent, then the brokering agent cannot be trusted and the process ends. If the response authenticates the brokering agent, then the secrets and service provider system 130 can provide a response that places the device in a state for transitioning to the second state. Then, the brokering agent can issue a request to the secrets and service provider system 130 for the encrypted version of the set of secrets data to be inserted into the device 110-1 for transitioning to the second state. The secrets and service provider system 130 can then provide the encrypted version of the set of secrets data to the brokering agent 120, which then forwards the encrypted version of the set of secrets data to the device 110-1 for secure storage on the device 110-1.

However, before the set of secrets data can be stored in the protected memory of the secrets containment component 112 for use, the device 110-1 first needs to be granted permission transition to the target state. In some embodiments, the device 110-1 can enter a supersession state, in which the device generates a supersession package. The supersession package is a set of data that is used to determine whether the device 110-1 has authority to supersede or overwrite a current set of secrets data corresponding to the current state of the device 110-1 with the set of secrets data corresponding to the target state. The supersession package can be forwarded to the secrets and service provider system 130 via the brokering agent. In response to determining that the device 110-1 has permission to transition to the target state (e.g., determining that supersession package is valid), the secrets and service provider system 130 can notify the device 110-1 that it has permission to transition to the target state. In some embodiments, the secrets and service provider system 130 can send a commit package to the device 110-1 via the brokering agent. The commit package is a set of data that is generated by the secrets and service provider system 130 as a response that confirms that the device has authority to supersede or overwrite the current set of secrets data with the set of secrets data corresponding to the target state. To prevent replay attacks and to ensure that the provisioning steps are called in order during a single session, one or more of the packages generated by the device 110-1 and/or the secrets and service provider system 130 can be generated based on content of the previously generated packages.

Storing the set of secrets data can include obtaining a decrypted version of the set of secrets data (e.g., locally decrypting the encrypted version of the set of secrets data), storing the decrypted version of the set of secrets data in the protected memory of the secrets containment component 112, cryptographically scaling the previous set of secrets data of the prior state, and updating a state maintained by a state machine to reflect the transition to the target state. Obtaining the decrypted version of the set of secrets data can include locally decrypting the encrypted version of the set of secrets data. For example, the keys needed to perform the decryption can be made available to the device 110-1 upon successful transition to the target state. Updating the state can include incrementing a programming sequence count with respect the state machine. Accordingly, the device 110-1 can be securely programmed by entities which possess its internal secret, and control of the device 110-1 can be securely transferred to entities as ownership of the device 110-1 is transferred between the entities throughout the supply chain lifecycle.

The distributed ledger system 120 can maintain records related to both current and previous entities that have had possession of the device through the supply chain lifecycle. The secrets and service provider system 130 can store transaction data on the distributed ledger system 120. The distributed ledger system 120 can maintain transactions relating to, e.g., entry of a device/chip with an identifier to the system 100, provisioning of secrets on devices, requests for restricted information from entities external to the system 100, registration of valid brokering agents, installation of registered software and/or software updates, transfer of device ownership (e.g., responsible party), registering network affiliations, and regression, resetting, removal or end-of-life of a device at any stage. For example, the secrets and service provider system 130 can provide record of the completed state transition on the distributed ledger system 120. The immutable storage of the transaction data on the distributed ledger system 120 ensures legitimacy and authenticity of the encrypted provisioning data. Accordingly, the distributed ledger system 120 can provide verifiable trust and support proof of origin for all transactions performed by the secrets and service provider system 130 within the system 100.

The API library of each of the devices 110-1 through 110-N (e.g., API library 114) can function to provide secure communications between other ones of the devices 110-1 through 110-N and/or the secrets and service provider system 130. For example, each API library (e.g., .so or .dll) can maintain a set of APIs to implement various cybersecurity and trust related operations using the set of secrets maintained on Examples of such operations include supporting secure communication, verifying system trust and/or data origin, supporting logistics and coordination of distributed assets, forensic tracking and accountability, and recovery from security compromise. Further details regarding API operations supported by the API library 114 for enabling cybersecurity will be described below with reference to FIGS. 4-7.

Figure 2:
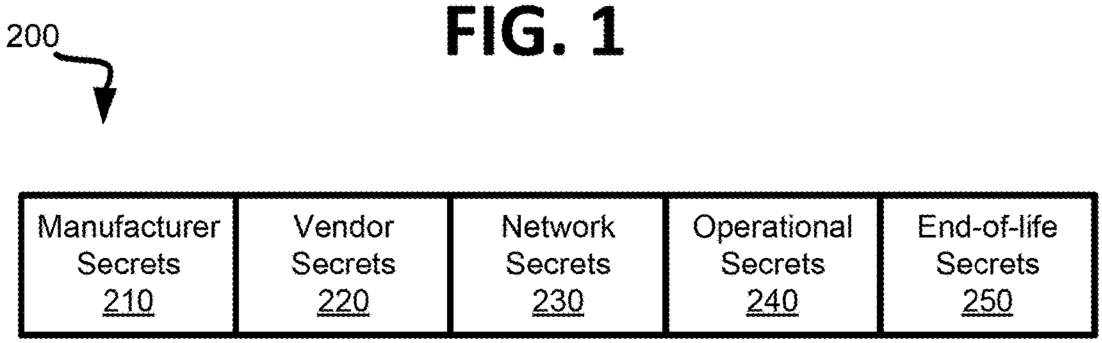
FIG. 2 is a block diagram illustrating various sets of secrets data that can be inserted onto a cryptographic enabled trust device, in accordance with some embodiments of the present disclosure.

FIG. 2 is a diagram 200 illustrating various types of sets of secrets data, in accordance with some embodiments. Each set of secrets data can be provisioned on a device (e.g., IoT device) can include a cryptographic key management block to enable cybersecurity functionality during a corresponding device state. The device state can correspond to a stage within the supply chain lifecycle of the device. For example, the diagram 200 shows of a set of manufacturer provisioning secrets data 210 that can be provisioned on a device during a manufacturing stage of the device in the supply chain, a set of vendor provisioning secrets 220 that can be provisioned on the device during a vendor stage of the device in the supply chain, a set of end-use provisioning secrets data 230 that can be provisioned on the device during a end-use stage of the device in the supply chain, a set of operational secrets data 240 that can be provisioned on the device during an operational stage of the device within the supply chain, a set of end-of-life secrets provisioning data 250. In some embodiments, each of the sets of secrets data 210-250 can include an NFT. Moreover, each of the sets of secrets data 210-250 can be recorded on a distributed ledger of a secrets and service provider system for immutability (e.g., the distributed ledger system 120 of FIG. 1).

The set of manufacturer provisioning secrets data 210 can include original manufacturer secrets that can be placed on the device directly by the manufacturer. For example, the set of manufacturer provisioning secrets data 210 can include a device identifier associated with the manufacturer (UID), and a provisioning transport key. The provisioning transport key, which can also be referred to as a key wrapping key or a key encryption key, is used to wrap a secret key to maintain confidentiality and authenticity during transportation of the secret key. The provisioning transport key can also be used for authentication and transport of a device's new privacy and boot verification secrets during vendor state reprogramming. For example, the provisioning transport key can hold a lot number between manufacturing and assignment to the device's first vendor. During a state progression of the device from the manufacturer state to the vendor state, the secrets and service provider system (e.g., the secrets and service provider system 130) can take ownership and overwrite the provisioning transport key of the set of manufacturer provisioning secrets data 210 to become a (primary) supply chain registrar.

The set of vendor provisioning secrets data 220 can include cryptographic data components specific to a vendor that is in possession of the device. When transitioning to the vendor provisioning state, the original manufacturer secrets are overwritten with the set of vendor provisioning secrets data. If the control of the device is being transferred from an old vendor to a new vendor, the set of old vendor provisioning secrets data is replaced by the set of new vendor provisioning secrets data, and the set of old vendor provisioning secrets data is maintained on the distributed ledger. The set of vendor provisioning secrets data 220 can include cryptographic data components such as a vendor certificate (e.g., vendor signed certificate), a set of private keys (e.g., private signing key and private encryption key), a vendor configuration, etc.

The set of end-use provisioning secrets data 230 can include cryptographic data components that can be linked to a particular network or product line, and can support cryptographic communications, trust root, and extended security/privacy features for physical security and logical data operations. For example, the set of end-use provisioning secrets data 230 can include a network certificate (e.g., certificate authority (CA) signed), a network exchange key for securely exchanging keys over a public network (e.g., Diffie-Hellman network exchange key), and symmetric secrets (e.g., network segment global secret, network sub-segment secrets, an authentication key, a privacy secret, and network segment derivation data). For example, if a new network is reprogrammed while the device is in the end-use provisioning state, the new network can be added to the device along with the old networks. The device can maintain a certain number of networks based on device memory specifications.

The operational state can enable generation of derived use secrets and ephemeral use (e.g., one-time use) keys during device operation. The set of operational secrets data 240 can be utilized for extending and augmenting operations performed by the device by creating derived or temporary use components. For example, the set of operational secrets data 240 can include a derived network secret, a network operation secret, a roll network key, and network segment derivation data (e.g., derivation timing, key supersession, roll number, key exchange timestamp). The set of operational secrets data 240 can be re-provisioned when adding another network segment, or replacing a compromised network segment.

The set of end-of-life provisioning secrets data 250 can support the removal of the device from the supply chain, and can provide solutions similar to certificate revocation with the expanded revocation of right-to-operate or removal of trusted status. The set of end-of-life provisioning secrets data 250 can include modified versions of the cryptographic components 210-240. In alternative embodiments, the set of end-of-life provisioning secrets data 250 can be provisioned separately from the device, such that the device does not store the set of end-of-life provisioning secrets data 250 locally on its protected memory. A device cannot be forced into end-of-life, but other entities within the system can be informed that the device should be treated as an end-of-life device.

Figure 3:
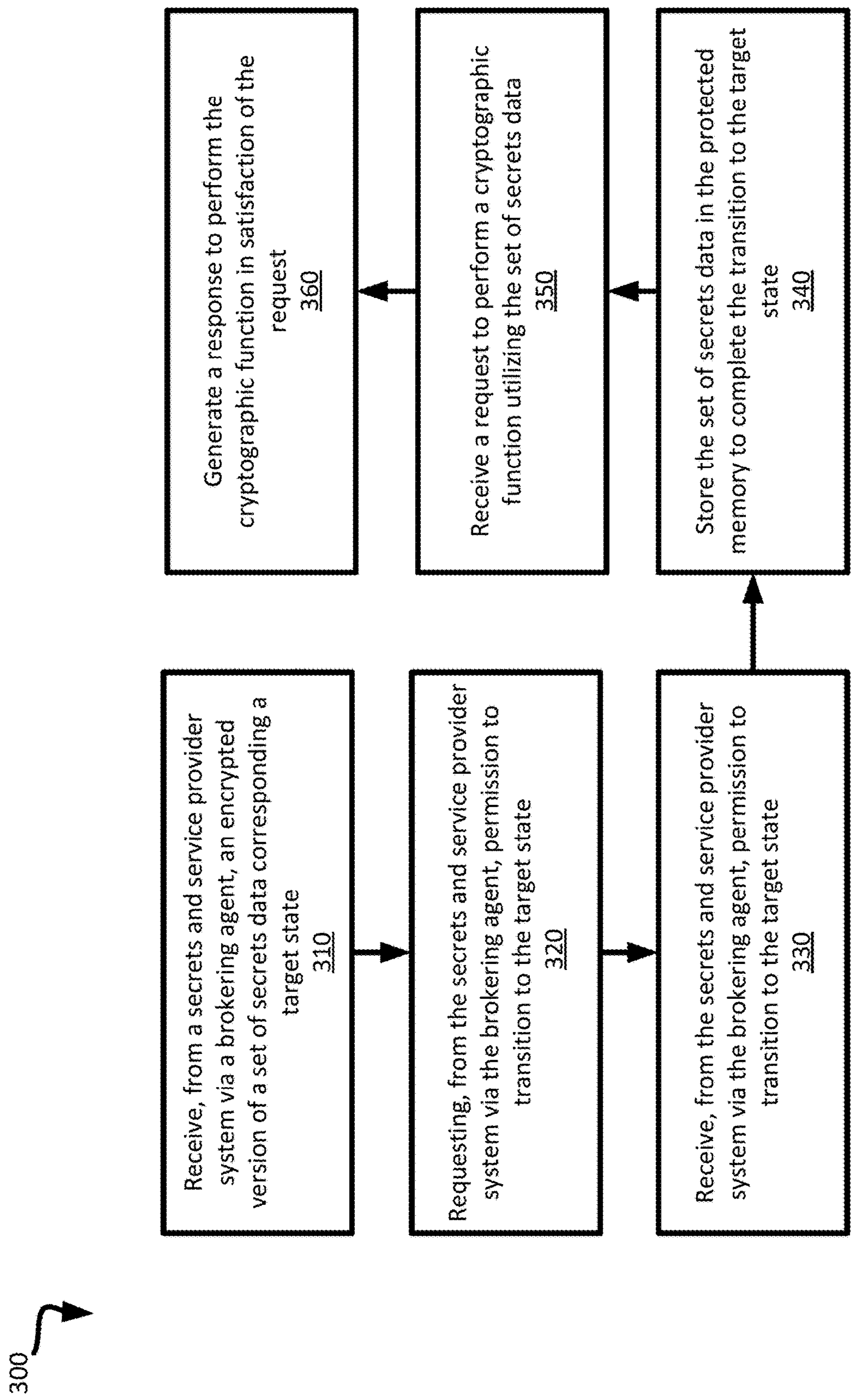
FIG. 3 is a flow diagram illustrating a method for controlling a state transition of a cryptographic enabled trust device, in accordance with some embodiments of the present disclosure.

FIG. 3 is a flow diagram of a method 300 for controlling a state transition of a cryptographic enabled trust device ("device"), in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the method 300 can be performed by processing logic implementing the device (e.g., the device 110-1 of FIG. 1). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic receives, from a secrets and service provider system via a brokering agent, an encrypted version of a set of secrets data corresponding to a target state of a device. For example, the secrets and service provider system can provide the encrypted version of the set of secrets data upon a request received via the brokering agent from the device, or another entity on behalf of the device, to initiate a state progression sequence from a current state to the target state. The brokering agent can obtain the encrypted version of the set of secrets data from encrypted storage of the secrets and service provider system. The encrypted version of the set of secrets data can be generated by the secrets and service provider system by uniquely encrypting each individual component of the set of secrets data with a respective key to obtain the set of secrets data, and then encrypting the sets of secrets data to obtain the encrypted version of the set of secrets data. In some embodiments, the processing logic can initiate the request via the brokering agent.

In some embodiments, the states correspond to respective supply chain states of the device within a supply chain. For example, the current state can be a manufacturer provisioning state corresponding to a manufacturing stage of the supply chain associated with the device manufacturer, a vendor provisioning state corresponding to a vendor stage of the supply chain associated with a vendor in possession of the device, an end-use provisioning state corresponding to an end-use stage of the supply chain (e.g., within a network or as a standalone device), an operational state corresponding to an operational stage of the supply chain, etc. The state progression sequence can include a transition from the manufacturer provisioning state to the vendor provisioning state, a transition from the vendor provisioning state to the end-use provisioning state, or a transition from the end-use provisioning state to the operational state. The encrypted version of the set of secrets data can include a set of manufacturer provisioning secrets data, a set of vendor provisioning secrets data, a set of end-use provisioning secrets data, or a set of operational secrets data. The brokering agent can be at least one of a manufacturer brokering agent, a vendor brokering agent, an end-use brokering agent, an operational brokering agent, etc.

At operation 320, the processing logic requests, from the secrets and service provider system via the brokering agent, permission to transition to the target state. In some embodiments, requesting permission to transition to the target state comprises generating a supersession package and sending, to the secrets and service provider system via the brokering agent, the supersession package to obtain permission to transition to the target state. The supersession package is a set of data that is used to determine whether the device has authority to supersede or overwrite a current set of secrets data corresponding to the current state of the device with the set of secrets data corresponding to the target state. The processing logic generates the supersession package while the device is placed in a supersession state.

If the secrets and service provider system denies permission for the device to transition to the target state, then the state transition process terminates and the device stays at its current state. However, if the secrets and service provider system receives permission for the device to transition to the target state at operation 330 then, at operation 340, the processing logic stores the set of secrets data in the protected memory to complete the transition to the target state. In some embodiments, receiving permission to transition to the target state includes receiving, from the secrets and service provider system via the brokering agent, a commit package to commit the set of secrets data. The commit package is a set of data that is generated by the secrets and service provider system as a response to the supersession package that confirms that the device has authority to supersede or overwrite the current set of secrets data with the set of secrets data corresponding to the target state.

In some embodiments, storing the set of secrets data in the protected memory to complete the transition to the target data includes obtaining a decrypted version of the set of secrets data (e.g., decrypting the encrypted version of the set of secrets data using the same encryption key used to encrypt the set of secrets data by the secrets and service provider system), storing the decrypted version of the set of secrets data on protected memory, cryptographically sealing the previous set of secrets data to protect the previous set of secrets data from unauthorized access, and updating a state maintained by a state machine of the device to reflect the transition to the target state.

The secrets and service provider system and/or the authorized brokering agent for the device can implement a number of sets of API methods for performing a progression sequence to transition between device states, where each set of API methods is used to transition the device to a next sub-state upon completion of a final API method of the set of API methods. For example, the progression sequence can be used to insert the set of secrets data corresponding to the target state onto the device, and seal the set of secrets data corresponding to the current state.

One example of a progression sequence is a progression sequence from a manufacturer provisioning state to a base provisioning state. While the device is in the manufacturer provisioning state, the secrets and service provider system can receive the lot information of the device from the manufacturer of the device. A first set of API methods can be implemented for transitioning the device to a Do Manufacturer Programming sub-state. For example, the first set of API methods can include "Read Device UID," "Read Manufacturer Programming Count," "Return Device State," "Read Configuration Signature," and "Do Manufacturer Programming." The API method "Read Device UID" receives a formatted message from the brokering agent for the device and returns a response with an identifier of the device (e.g., UID). The API method "Read Manufacturer Programming Count" passes a properly formatted message from the brokering agent for the device and returns a current number of manufacturing programming counts. A manufacturing programming count is an openly-readable number corresponding to a number of times that the manufacturing programming method has been successfully completed. The API method "Return Device State" is generally available to return a current state of the device. This API method can be equipped with a timer as to how often it can be called to ensure that repeated calling does not interfere with the operation of the device, but also that it cannot be a feature used for an attack (e.g., Denial of Service attack). The API method "Read Configuration Signature" is generally available to return a hash value of the current configuration of the contents of memory of the device. This method can also be equipped with a timer as to how often it can be called to ensure that repeated calling does not interfere with the operation of the device, but also that it cannot be a feature used for an attack (e.g., Denial of Service attack). The API method "Do Manufacturer Programming" is called during the programming sequence and is passed authentication credentials from the manufacturer. This API method can enable the device to receive contents upon calling the "Receive Encrypted Stream" API method, as will be described in further detail below.

While the device is in the Do Manufacturer Programming sub-state, a second set of API methods can be implemented for transitioning the device to a Post Stream Received sub-state. For the example, the second set of API methods can include "Read Device UID," "Read Programming Count Pre," "Read Programming Count Post," "Return Device State," and "Receive Encrypted Stream." An encrypted version of the set of manufacturer provisioning secrets data can be received from encrypted storage of the secrets and service provider system. The API method "Read Programming Count Pre" is active after "Do Manufacturer Programming" is called and before its timeout is reached. This API method can be used during a supersession sequence when two sets of Manufacturer Programming Count records exist. This API method returns a current Manufacturer Programming Count (as opposed to a temporary value which is in the process of being promoted). The API method "Read Programming Count Post" is also active after "Do Manufacturer Programming" is called and before its timeout is reached, and can be used during a supersession sequence and when two sets of Manufacturer Programming Count records exist. In contrast to "Read Programming Count Pre," "Read Programming Count Post" returns a new temporary value which is in process of being promoted (not the current Manufacturer Programming Count). The API method "Receive Encrypted Stream" is called after "Do Manufacturer Programming" before its timeout is reached. This API method can receive an encrypted stream including the encrypted version of the set of manufacturer provisioning secrets. The encrypted stream can further include a checksum for proper insertion onto the device. The device can then be placed in a "Verify State" with a timeout for verification. After performing the "Receive Encrypted Stream" API method, it is determined if programming is complete. If not, the progression sequence can revert the device back to the manufacturer provisioning state. If so, the progression sequence can transitions the device to the Post Stream Received sub-state.

While the device is in the Post Stream Received sub-state, a third set of API methods can be implemented for transitioning the device to a Verify Manufacturer Secrets sub-state. For example, the third set of API methods can include "Read Device UID," "Read Programming Count Pre," "Read Programming Count Post," "Return Device State," and "Verify Manufacturer Initial Program." A configuration verification stream can also be sent to a manufacturer brokering agent. The API method "Verify Manufacturer Initial Program" can be called after "Receive Encrypted Stream" while in the device is in a Verify State. A Verify State check can be performed for supersession requirements, and the device can be placed in a Waiting Commit State to wait for a determination of whether a commit has been received. If not, the progression sequence can revert the device back to the manufacturer provisioning state. If so, the progression sequence can transition the device to the Verify Manufacturer Secrets sub-state.

While the device is in the Verify Manufacturer Secrets sub-state, a fourth set of API methods can be implemented for transitioning the device to the base provisioning state. For example, the fourth set of API methods can include "Read Device UID," "Read Programming Count Pre," "Read Programming Count Post," "Return Device State," and "Commit Base Provisioning Supersession." The API method "Commit Base Provisioning Supersession" can be called after "Verify Manufacturer Initial Program" to commit the programming change to the device. To perform "Commit Base Provisioning Supersession," a Supersession Commit Packet can be received (e.g., from the manufacturer brokering agent). After performing "Commit Base Provisioning Supersession," the progression sequence transitions the device to the base provisioning state.

Now that the device is in the base provisioning state, ownership of the device is assigned to the secrets and service provider system. Control and accountability of the device in the base provisioning state can then be assigned to the manufacturer brokering agent. Disposition of the device while in the base provisioning state is the responsibility of the manufacturer brokering agent until ownership of the device is transferred to another entity.

Another example of a progression sequence is a progression sequence from the base provisioning state to a vendor provisioning state. This progression sequence is performed to transfer control and accountability of the device to a vendor within the supply chain. For example, while the device is in the base provisioning state, a first set of API methods can be implemented for transitioning the device to a Do Vendor Programming sub-state. For example, the first set of API methods can include "Read Device UID," "Read Programming Count," "Return Device State," "Return Accountability Info," "Read Configuration Signature," "Do Manufacturer Programming" and "Do Vendor Programming." The API method "Do Vendor Programming" can use an encrypted stream originating from the vendor brokering agent authorized by the secrets and service provider system to perform vendor programming operations. The encrypted stream can include the encrypted version of the set of vendor provisioning secrets data, in addition to transport protocol content and other metadata. The device can be placed in a first sub-state for Vendor Programming, enable the "Verify Authority" method, and enter a timeout period where only the visible functions are available. After performing "Do Vendor Programming," the progression sequence transitions the device to the Do Vendor Programming sub-state.

While the device is in the Do Vendor Programming sub-state, a second set of API methods can be implemented for transitioning the device to a Verify Authority sub-state. For the example, the second set of API methods can include "Read Device UID," "Read Responsible Vendor Pre," "Read Responsible Vendor Post," "Return Device State," and "Verify Authority." An encrypted request stream can be received from the secrets and service provider system, and a configuration verification stream can be sent to the secrets and service provider system. The API method "Read Responsible Vendor Pre" is active after "Do Vendor Programming" is called and before its timeout is reached. This API method can be used during a supersession sequence when two sets of vendor provisioning secrets data exist. This API method returns a current Vendor Certificate, and not a new temporary Vendor Certificate which is in the process of being promoted. The API method "Read Responsible Vendor Post" is also active after "Do Vendor Programming" is called and before its timeout is reached. This API method can be used during a supersession sequence and when two sets of vendor provisioning secrets data exist. In contrast to "Read Responsible Vendor Pre," this API method returns a new temporary vendor certificate which is in the process of being promoted (not the current vendor certificate).

The API method "Verify Authority" is utilized after the secrets and service provider system has been contacted and sent verification credentials. The encrypted stream originating from the vendor brokering agent is verified by the device to determine that the secrets and service provider system has authority to change the programming of the device. If "Verify Authority" is successful, the device is placed in a state where the "Insert Vendor Secrets" method is activated and a timeout is enabled. If "Verify Authority" fails, the device can be reset to a state before the "Do Vendor Programming" API method was utilized. After performing "Verify Authority," the progression sequence can transition to the Verify Authority sub-state barring any trigger that causes a reversion of the state of the device back to the base provisioning state (e.g., a timeout).

While the device is in the Verify Authority sub-state, a third set of API methods can be implemented for transitioning the device to an Insert Vendor Secrets sub-state. For example, the third set of API methods can include "Read Device UID," "Read Responsible Vendor Pre," "Read Responsible Vendor Post," "Return Device State," and "Insert Vendor Secrets." A new set of vendor provisioning secrets data and an installation verification stream can be received from the encrypted storage. The API method "Insert Vendor Secrets" is called after "Verify Authority" is performed to insert/program the new set of vendor provisioning secrets data into the device. For example, the vendor brokering agent can retrieve the new set of vendor provisioning secrets data from the secrets and service provider system, and send the new set of vendor provisioning secrets data to the device for insertion/programming. After the new set of vendor provisioning secrets data is inserted into the device, the device can operate in an Awaiting Commit State. If the Awaiting Commit state is achieved and a previous set of vendor provisioning secrets data exists in the device, then both the previous and the new sets of vendor provisioning secrets data can be maintained in the device (with both Vendor Certificates available) until the "Commit Vendor Supersession" API method is called, or a trigger causes a reversion of the state of the device to its previous state condition (e.g., a timeout). After the new set of vendor provisioning secrets data is inserted, the progression sequence can transition the device to the Insert Vendor Secrets sub-state barring any trigger that causes a reversion of the state of the device back to the base provisioning state (e.g., timeout).

While the device is in the Insert Vendor Secrets sub-state, a fourth set of API methods can be implementing for transitioning the device to a Seal Manufacturer Secrets sub-state. For example, the fourth set of methods can include "Read Device UID," "Read Programming Count Pre," "Read Programming Count Post," "Return Device State," and "Commit Vendor Provisioning Supersession." The API method "Commit Vendor Provisioning Supersession" can commit the newly inserted/programmed set of vendor secrets data into operation, thereby superseding previous credentials. To perform the "Commit Vendor Provisioning Supersession" API method, a Supersession Commit Packet can be received from the encrypted storage. After performing the "Commit Vendor Provisioning Supersession" API method, the set of manufacturer provisioning secrets data on the device can be sealed to arrive at the Seal Manufacturer Secrets sub-state, and the progression sequence can transition to the vendor provisioning state.

Now that the device is in the vendor provisioning state, ownership of the device is assigned to the corresponding vendor. Should accountability for the device need to change hands to a new vendor, the vendor reassignment process can be conducted in a similar way as the assigned vendor by calling the "Do Vendor Programming" routine again, and following the same process described above.

Another example of a progression sequence is a progression sequence from the vendor provisioning state to an end-use provisioning state. More specifically, once the vendor has completed any required tasks with the device containing the device and is ready to pass the device along to an end-use stage of the supply chain, the secrets and service provider system can transition the device from the vendor provisioning state to the end-use provisioning state. For example, while the device is in the vendor provisioning state, a first set of API methods can be implemented for transitioning the device to a Do End-Use Programming sub-state. For example, the first set of API methods can include "Read Device UID," "Read Programming Count," "Return Device State," "Return Accountability Information," "Return Configuration Signature," "Read Configuration Signature," "Revert to Base Provisioning State," "Do Vendor Programming," and "Do End-Use Programming." The API method "Do End-Use Programming" initiates the process of inserting/programming a set of end-use provisioning secrets into the device. This API method can utilize an encrypted stream originating from an end-use brokering agent authorized by the secrets and service provider system to perform End-Use Programming operations. The encrypted stream can include the encrypted version of the set of end-use provisioning secrets, in addition to transport protocol content and other metadata. After performing "Do End-Use Programming," the progression sequence transitions to the Do End-Use Programming sub-state.

While the device is in the Do End-Use Programming sub-state, a second set of API methods can be implemented for transitioning the device to a Verify Authority sub-state. For the example, the second set of API methods can include "Read Device UID," "Read Responsible Vendor Pre," "Read Responsible Vendor Post," "Return Device State," and "Verify Authority," similar to those methods described above. An encrypted request stream can be received from the secrets and service provider system, and a configuration verification stream can be sent to the secrets and service provider system. After performing "Verify Authority," the progression sequence can transition to the Verify Authority sub-state barring any trigger that causes a reversion of the state of the device back to the vendor provisioning state (e.g., timeout).

While the device is in the Verify Authority sub-state, a third set of API methods can be implemented for transitioning the device to an Insert End-Use Secrets sub-state. For example, the third set of API methods can include "Read Device UID," "Read Responsible Vendor Pre," "Read Responsible Vendor Post," "Return Device State," and "Insert End-Use Secrets." A encrypted version of the set of end-use provisioning secrets data and an installation verification stream can be received from the encrypted storage.

The API method "Insert End-Use Secrets" can be called after "Verify Authority" is performed to place the device in a "Waiting End-Use Secrets" state. Information from the current end-use segment and sub-segments can be collected (e.g., by the end-use brokering agent), and the collected information can be used to create a new set of end-use provisioning secrets data for insertion onto the device. For example, the secrets and service provider system can insert the new set of end-use provisioning secrets data onto the device. The "Insert End-Use Secrets" API has a number of capabilities for inserting a new set of end-use provisioning secrets data onto the device, determined based on the contents of the new set of end-use provisioning secrets data. For example, one capability is to add an additional set of end-use provisioning secrets data and another capability is to overwrite the previous set of end-use provisioning secrets data. Other considerations can include determining the exact contents and differences between the previous and new set of end-use provisioning secrets data. Once the new set of end-use provisioning secrets data is inserted, the device can then operate in an "Awaiting Commit" state. If this state is achieved and a previous set of end-use provisioning secrets data exists, then both the previous and new set of end-use provisioning secrets data can be maintained in device (with both Network Certificates available) until the "Commit Vendor Supersession" API method is called or a timeout or other trigger can revert the state of the device to its previous state. After performing "Insert End-Use Secrets," the progression sequence can transition to the Insert Vendor Secrets sub-state barring any timeout or other trigger that causes a reversion of the state of the device back to the vendor provisioning state.

While the device is in the Insert End-Use Secrets sub-state, a fourth set of API methods can be implemented for transitioning the device to a Seal Vendor Secrets sub-state. For example, the fourth set of methods can include "Read Device UID," "Read Programming Count Pre," "Read Programming Count Post," "Return Device State," and "Commit End-use Provisioning Supersession." To perform "Commit End-use provisioning Supersession," a Commit Supersession Stream can be received from the secrets and service provider system. The API method "Commit End-Use Provisioning Supersession" commits the set of end-use provisioning secrets data and supersedes old credentials (e.g., old end-use brokering agent credentials). After performing the "Commit End-Use Provisioning Supersession" API method, the set of vendor provisioning secrets data previously inserted onto the device can be sealed to arrive at the Seal Vendor Secrets sub-state, and the progression sequence can transition to the end-use provisioning state.

Another example of a progression sequence is a progression sequence from the end-use provisioning state to an operational state. More specifically, once the device is in the end-use provisioning state, the secrets and service provider system can transition the device from the end-use provisioning state to the operational state in which the device can operate on the network. For example, while the device is in the end-use provisioning state, a first set of API methods can be implemented for transitioning the device to a Create Operational Configuration sub-state. For example, the first set of API methods can include "Read Device UID," "Return Device State," "Return Accountability Information," "Return Vendor Certificate," "Return Network Certificate," "Read Configuration Signature," "Revert to Vendor Provisioning State," "Do End-Use Programming," and "Create Operational Configuration." The API method "Return Vendor Certificate" can read the Vendor Certificate from the device, and the API method "Return Network Certificate" can read the Network Certificate from the device. These API methods can be equipped with a timer as to how often it can be called to ensure that repeated calling does not interfere with the operation of the device, but also that it cannot be a feature used for an attack (e.g., Denial of Service attack). The API method "Revert to Vendor Provisioning State" can be used to revert back to the vendor provisioning state in order to remove the set of end-use provisioning secrets data and unseal the currently-sealed set of vendor provisioning secrets data. This API can require permission from the secrets and service provider system through an authorized vendor brokering agent. The API method "Create Operational Configuration" can initiate the process of generating an operational configuration inside of the device, followed by the (partial) sealing of the set of end-use provisioning secrets data. This may require communication with at least one of the secrets and service provider system, the end-use brokering agent, etc. After performing "Create Operational Configuration," the progression sequence transitions to the Create Operational Configuration sub-state.

While the device is in the Create Operational Configuration sub-state, a second set of API methods can be implemented for transitioning the device to a Verify Authority sub-state. For the example, the second set of API methods can include "Read Device UID," "Read Operational Configuration Pre," "Read Operational Configuration Post," "Return Device State," and "Verify Authority." An encrypted request stream can be received from the secrets and service provider system, and operational components can be sent to the secrets and service provider system. The API method "Read Operational Configuration Pre" is generally active after "Create Operational Configuration" is called and before its timeout is reached. This API method can be used during a supersession sequence and when two sets operational secrets data exist. This method returns the current use Operational Configuration and not the new temporary Operational Configuration that is in the process of being promoted. The API method "Read Operational Configuration Post" is generally active after "Create Operational Configuration" is called and before its timeout is reached. This method is used during a supersession sequence and when two sets of operational secrets provisioning data exist. This method returns the new temporary Operational Configuration which is in the process of being promoted and not the current use Operational Configuration. After performing the "Verify Authority" API method, the progression sequence can transition to a Verify Authority sub-state barring any timeout or other trigger that causes a reversion of the state of the device back to the end-use provisioning state.

While the device is in the Verify Authority sub-state, a third set of API methods can be implemented for transitioning the device to a Spawn Operational Configuration sub-state. For example, the third set of API methods can include “Read Device UID,” “Read Responsible Vendor Pre,” “Read Responsible Vendor Post,” “Return Device State,” and “Spawn Operational Configuration.” An Owner Authorization Package and an Authentication Verification Stream can be received from the secrets and service provider system. The API method “Spawn Operational Configuration” can cause the creation of an operational configuration based on the set of end-use provisioning secrets data and network segment/sub-segments information provided during the End-Use Programming. After performing the “Spawn Operational Configuration” API method, the progression sequence can transition to the Spawn Operational Configuration sub-state, barring any timeout or other trigger that causes a reversion of the state of the device back to the end-use provisioning state.

While the device is in the Spawn Operational Configuration sub-state, a fourth set of API methods can be implemented for transitioning the device to a Seal End-Use Secrets sub-state. For example, the fourth set of API methods can include “Read Device UID,” “Read Programming Count Pre,” “Read Programming Count Post,” “Return Device State,” and “Commit Operational Supersession.”

The API method “Commit Operational Supersession” can commit the operational configuration created using the “Spawn Operational Configuration” API method. To perform “Commit Operational Supersession,” a Commit Supersession Stream can be received from the encrypted storage. After performing the “Commit Operational Supersession” API method, the set of end-use provisioning secrets data can be sealed to arrive at the Seal End-Use Secrets sub-state, and the progression sequence can transition to the operational state.

At operation 360, the processing logic receives a request to perform a cryptographic function utilizing the set of secrets data and, at operation 370, the processing logic generates a response to perform the action in satisfaction of the request. More specifically, the request can be received via the API library on the device, which is operatively coupled to the chip to enable cryptographic functionality (e.g., cybersecurity features).

In some embodiments, the request includes a request to perform at least one of obtaining a single-use ephemeral key, obtaining a proof of origin for a data item, generating a session key to establish a communication session between paired devices, creating a digital proof of integrity for verifying a message transferred between devices, generating a verification code to track supply chain asset security for a supply chain asset, implementing a change to the security posture of an organization for detecting and preventing cybersecurity threats, or tracking device trust. The response can then include the single-use ephemeral key, the proof of origin, the session key, the digital proof of integrity, the verification code, the security posture change, and/or a configuration sequence used to track device trust.

In some embodiments, the API library includes a set of asymmetric API methods, and the request includes a request to create a proof of origin for a data item, retrieve an asymmetric session public key for creating a device pairing session, initialize a primary asymmetric session, verify the proof of origin, commit the primary asymmetric session, implement a secondary asymmetric session, and/or retrieve an asymmetric session public certificate. The response can then include an authentication signature to perform a digital signing operation to create the proof of origin, the asymmetric session public key, a set of data to initialize the primary asymmetric session generated based on the asymmetric session public key, a proof of origin verification generated using asymmetric decryption, a full session key to commit the primary asymmetric session, a secondary system session response and session key, and/or the asymmetric session public certificate.

In some embodiments, the API library includes a set of symmetric API methods, and the request includes a request to perform at least one of retrieving an operational symmetric key, initializing a roll sequence to roll an old operational symmetric key to a new operational symmetric key, confirming the roll sequence, retrieving a verification code to perform message authentication, verifying the message authentication, committing the message authentication, or retrieving a one-time pad (OTP). The response can then include the operational symmetric key, initialization of the roll sequence, confirmation of the roll sequence and deletion of the old operational symmetric key, the verification code, an authentication package to verify the message authentication, a verification package to commit the message authentication, and/or the OTP. Further details regarding operations 310-370 are described above with reference to FIGS. 1-2 and will be described below with reference to FIGS. 4-10.

Figure 4:
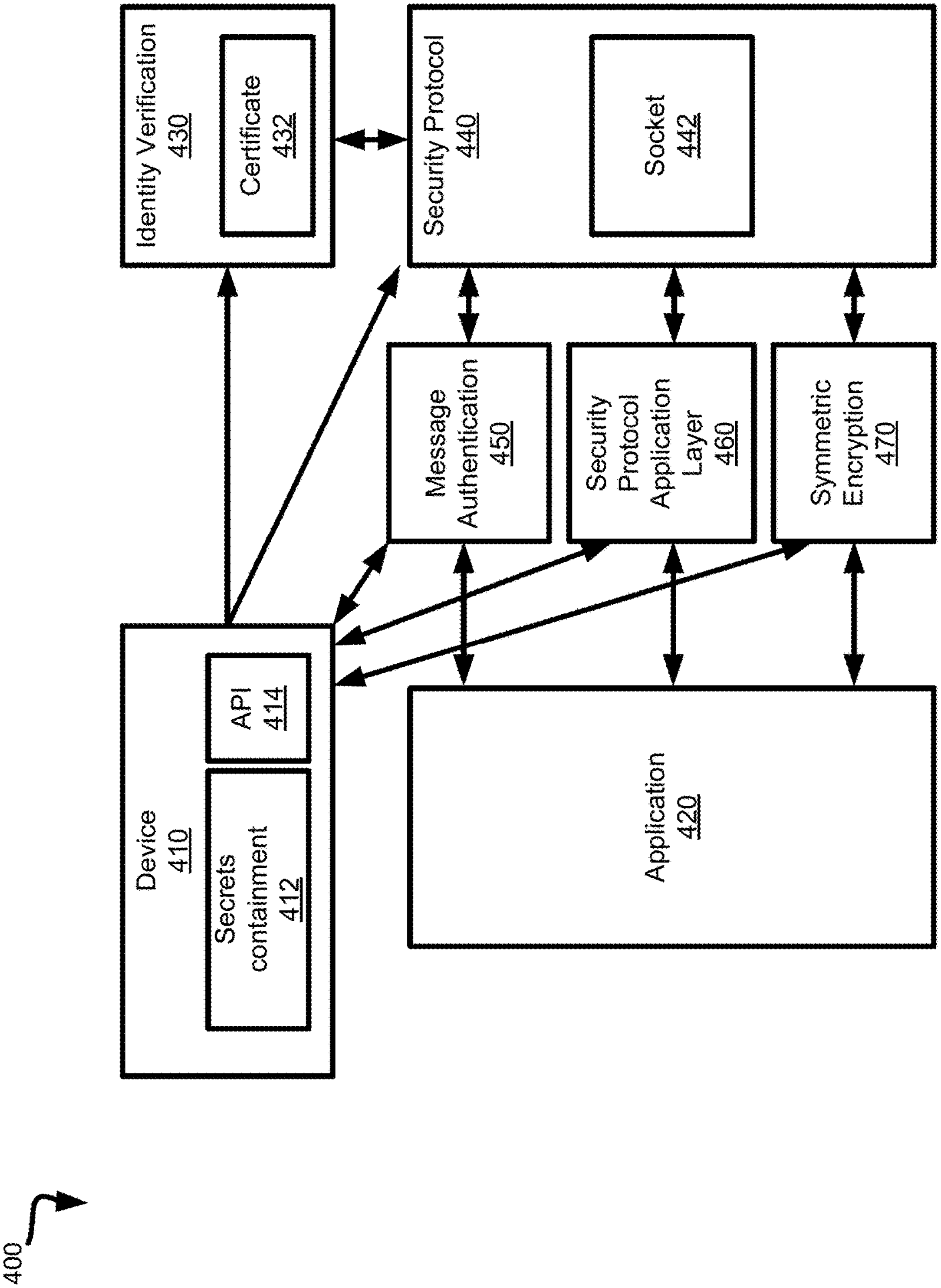
FIG. 4 is a block diagram of an example system for enabling cybersecurity features, in accordance with some embodiments of the present disclosure.

FIG. 4 is an example system 400 for enabling cybersecurity features, in accordance with some embodiments of the present disclosure. As shown, the system 400 can include a cryptographic trust enabled device (“device”) 410, which can be represented by the device 110-1 of FIG. 1. The device 410 can include a secrets containment component 412 and an API library (“API”) 414 maintaining one or more sets of APIs. The system 400 can enable secure secrets provisioning and/or changing of cryptographic keys with respect to the device 410. Further details regarding the device 410 are described above with reference to FIGS. 1-3.

The system 400 can further include an application 420. The device 410 can communicate with the application via one or more brokering agents. In some embodiments, the application 420 can implement a distributed ledger system. For example, the distributed ledger system can be used to maintain transaction data for tracking the device 410 within a supply chain.

The system 400 can further include an identity verification component 430. The identity verification component 430 maintains a digital certificate (e.g., public key certificate) (“certificate”) 432 used to perform identity verification for establishing secure communications. For example, the certificate 432 can be used to establish secure communications upon receiving a certificate signing request signed using a private key of a public/private key pair, where the certificate signing request includes the public key of the key pair. The certificate 432 can include the public key, identifiers of the issuer and requester, a certificate signature associated with a designated certificate signature method, etc. The certificate 432 binds the public key to the requester to ensure authenticity. The certificate 432 can be defined using any suitable format. In some embodiments, the certificate 432 is a certificate defined by the X.509 standard (“X.509 certificate”). For example, the certificate 432 can be retrieved using the API 604 that will be described below with reference to FIG. 6.

The system 400 can further include a security protocol component 440. The security protocol component 440 can be used to implement a communication security protocol to provide secure communications, including privacy and data integrity, within the system 400. For example, the security protocol 440 can utilize the certificate 432 described above. The communication security component 440 can maintain a network socket ("socket") 442 that functions as an endpoint for receiving and/or sending data within the system 400. The socket 442 can have a socket address including an IP address, port number, etc. The security protocol component 440 can implement any suitable communication security protocol in accordance with the embodiments described herein. In some embodiments, the communication security component 440 is a Transport Layer Security (TLS) component implementing a TLS protocol.

The device 410, via the API library 414, can be used to establish a variety of cybersecurity features. For example, the API library 414 can be used to establish secure communications with the application 420 and/or other devices within the system 400. Examples of cybersecurity features can include message authentication 450, a security protocol application layer 460, and symmetric encryption 470. The message authentication feature 450 can be implemented using, for example, API 540 described below with reference to FIG. 5, and APIs 608, 610 and 612 described below with reference to FIG. 6. The security protocol application layer 460 can provide Virtual Private Network (VPN) functionality and can be implemented using, for example, the API 530 described below with reference to FIG. 5. The symmetric encryption feature 470 can be implemented using, for example, API 610 described below with reference to FIG. 6, and APIs 704, 706 and 714 described below with reference to FIG. 7.

Figure 5:
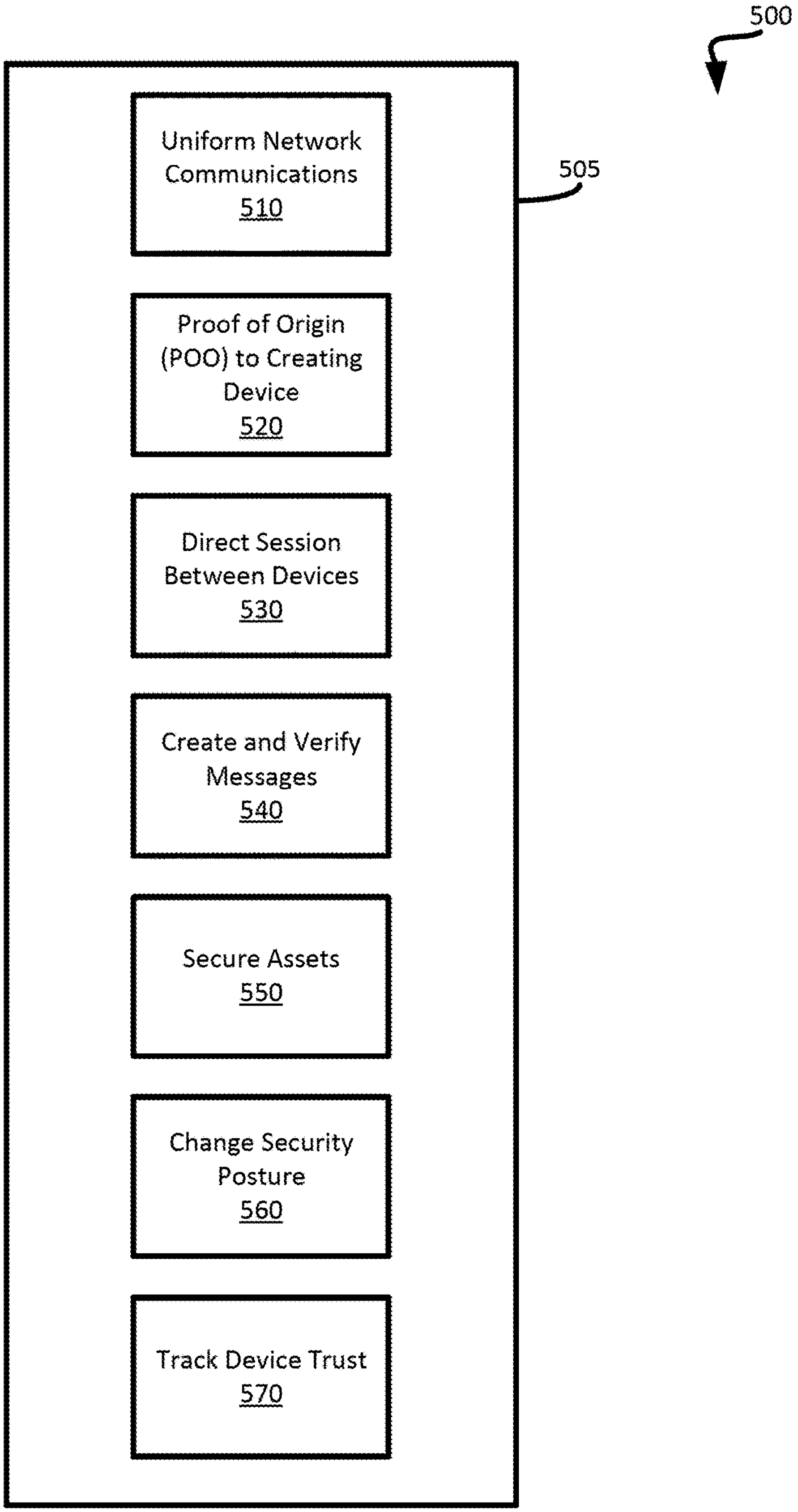
FIG. 5 is a block diagram of example application programming interface (API) methods implemented by a cryptographic enable trust device for enabling cybersecurity features, in accordance with some embodiments of the present disclosure.

FIG. 5 is a diagram 500 of application programming interface (API) methods for enabling cybersecurity features, in accordance with some embodiments of the present disclosure. As shown, the diagram 500 includes an API library 505. The API library 505 can be maintained on a cryptographic trust enabled device. For example, the API library 505 can be similar to the API library 114 maintained on the device 110-1, as described above with reference to FIG. 1. In this example, the API library 505 maintains a number of APIs 510 through 570 that implement various functionalities related to enabling cybersecurity features.

A uniform network communications API 510 can obtain a single-use ephemeral key for a cryptographic enabled trust device, which can be used for any suitable purpose needed by an application. To obtain the single-use ephemeral key, the API 510 can cause the cryptographic enabled trust device to generate the single-use ephemeral key, and the cryptographic enabled trust device can return the single-use ephemeral key in satisfaction of the request. The single-use ephemeral key can be generated by the cryptographic enabled trust device based on a seed string of bits. The single-use ephemeral key can be used to perform symmetric encryption of communications. Each cryptographic trust enabled device that is provisioned by a secrets and service provider system (e.g., the secrets and service provider system 130 of FIG. 1) to operate together on a same network segment can use a same string of bits to generate a same single-use ephemeral key.

A proof of origin (POO) to creating device API 520 can obtain digitally signed content for any data item (e.g., data content, code files, or driver updates) that will be provably linked to the cryptographic enabled trust device. To obtain the digitally signed content, the API 520 can create a POO for a data item, and the cryptographic enabled trust device can generate and send a verifiable POO from the created POO in satisfaction of the request. That is, the digitally signed content serves as a POO for the data item, and can be used to prove that the cryptographic enabled trust device produced the data and that the integrity of the data item has not changed since it was created. A POO can be maintained on a distributed ledger (e.g., of the distributed ledger system 120 of FIG. 1), such that its corresponding data item becomes immutably linked with the POO and takes on properties of a token (e.g., NFT) of the data item.

A direct session between devices API 530 can generate a session key unique to a pair of cryptographic trust enabled devices ("paired devices") (e.g., the device 110-1 and the device 110-N), and establish a paired session between the paired devices. The session key can be produced in a multiple step process between the paired devices. For example, two indecipherable strings of bits can be encrypted and asymmetrically exchanged between the paired devices to produce the same string of bits on each end. The same string of bits can then be to support symmetric encryption of communications between the paired devices. The paired session can be used for any suitable use case, and can persist for as long as the use case requires or can be re-established as required. For example, the paired session can be effective for suitable one-to-one pairing connection-based operations, such as establishing Virtual Private Networks.

A create and verify message API 540 can create a digital proof of integrity for verifying a transferred message which contains input from both a sending cryptographic trust enabled device (e.g., the device 110-1) and a receiving cryptographic trust enabled device (e.g., the device 110-N). The message verification can use a multiple-part handshake sequence, which can additionally be required to complete internal device operations within a preset time for successful operation. This capability can be used by any suitable application to verify that a communication sequence maintains integrity and is completed within the preset timing requirement. For example, the API 540 can be used in embodiments in which the cryptographic enabled trust device implements digital communication for electro-mechanical operations on equipment with physical components.

A secure assets API 550 can provide and track supply chain asset security for an asset on the supply chain. For example, the API 550 can implement supply chain security by utilizing a one-time pad (OTP) feature to verify a string of bits, which can be related to either a serial/model number for physical items or configuration/version number for digital content. Supply chain asset security can be verified at one point in time, and then verified against the same string of bits at a later point in time or in a different location. Supply chain asset security for an asset can be tracked by having a cryptographic enabled trust device generating an OTP response including a verification code based on asset identity, and verifying whether the response repeats the anticipated or previous stored value based on the verification code. The verification can optionally be done with support of the secrets and service provider system 130.

A change security posture API 560 can implement security posture changes to enable changing of non-public secrets in a predictable but non-reversible manner. A device may also be reverted to its vendor-programmed state, to clear all network data and await a new set of secrets data. A security posture change can be performed by the API 560 in various ways.

One way that a security posture change can be performed by the API 560 is by implementing a roll feature to roll from a first internal value (e.g., internal string of bits) of the cryptographic enabled trust device to a second internal value of the cryptographic enabled trust device. The roll feature can utilize the OTP feature described above to create a new unknown internal value (internal secret) based on a seed value, which is subsequently used to replace the existing unknown internal value. This feature enables all devices that are provisioned for ephemeral key network segment operations to simultaneously change their internal values while keeping their respective internal values secrets.

Another way to that a security posture change can be performed by the API 560 is by re-provisioning and replacing existing internal values with new internal values. Re-provisioning and replacing the existing internal values can be performed using the secrets and service provider system (e.g., secrets and service provider system 130) through a process which invokes a temporary state change in the cryptographic enabled trust device, after which a new set of keys and a permission sequence to commit the temporary state change to a permanent state change are received.

A track device trust API 570 receives a configuration sequence generated by the cryptographic enabled trust device to: (1) verify a POO for a previously created data item; (2) verify whether internal content of the cryptographic enabled trust device itself has not changed, or that the internal content matches a known or expected value; and/or (3) determine that the data item is received from an authorized source. The verification process can be done with respect to a data item having an external origin relative to the cryptographic enabled trust device and/or can be optionally be performed with support of the secrets and service provider system 130.

Figure 6:
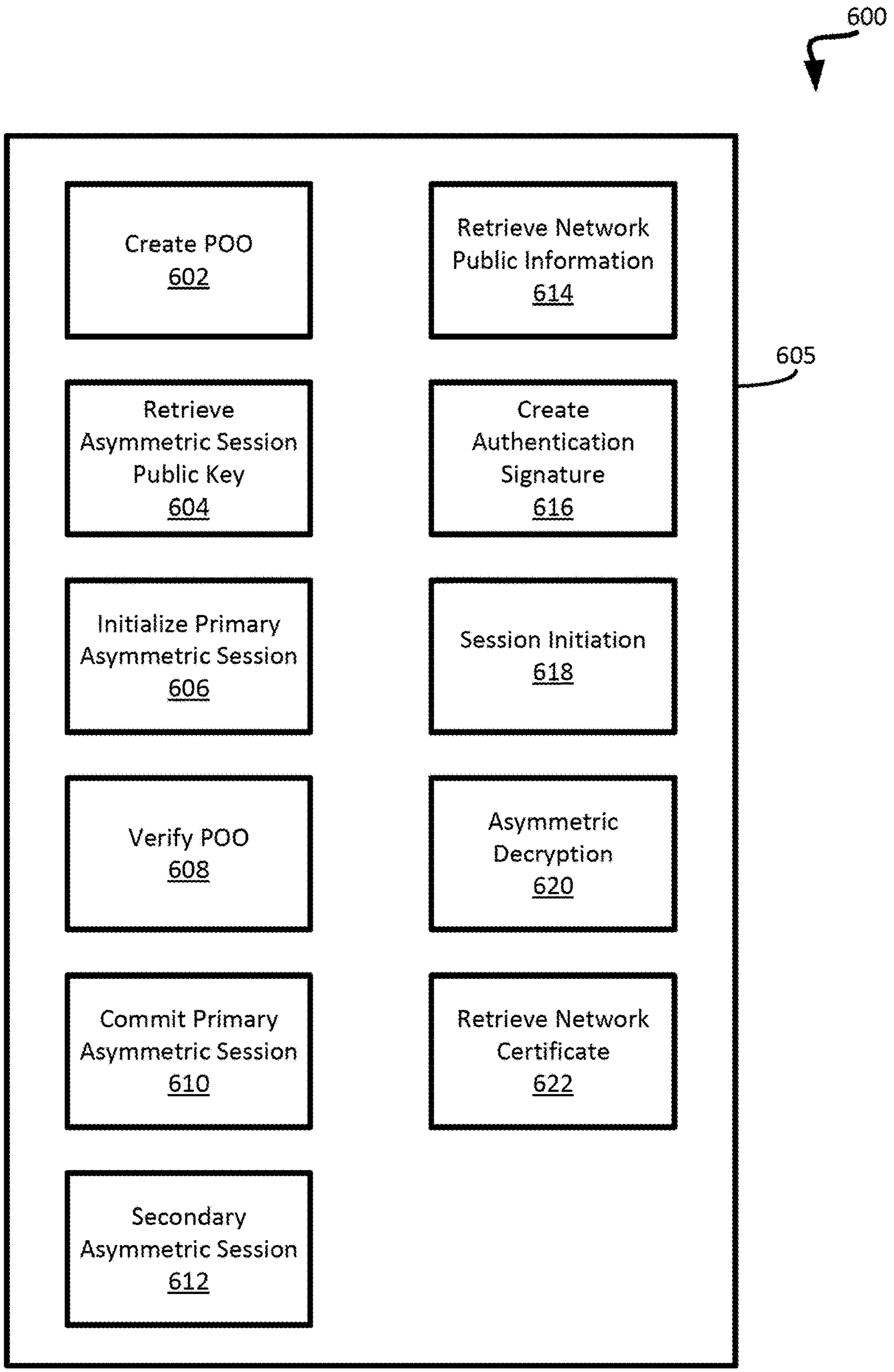
FIG. 6 is a block diagram of example asymmetric application programming interface (API) methods implemented by a cryptographic enable trust device for enabling cybersecurity features, in accordance with some embodiments of the present disclosure.

FIG. 6 is a diagram 600 of asymmetric API methods for enabling cybersecurity features, in accordance with some embodiments of the present disclosure. The asymmetric API methods can utilize asymmetric key pairs (e.g., private key and public key), which can provide enhanced security relative to symmetric API methods, such as those described below with reference to FIG. 7.

As shown, the diagram 600 includes an API library 605. The API library 605 can be maintained on a cryptographic trust enabled device. The API library 605 can be maintained on a cryptographic trust enabled device. For example, the API library 605 can be similar to the API library 114 maintained on the device 110-1, as described above with reference to FIG. 1. In this example, the API library 605 maintains a number of APIs 602-622 that implement various asymmetric API methods for enabling cybersecurity features. Other devices (e.g., device 110-N) can maintain respective API libraries.

A create proof of origin (POO) API 602 can create a POO for a data item that proves the origin of the data item. To create the POO, the API 602 passes input data to be digitally signed. The input data can include a data item and a hash of the data item. More specifically, the data item can be received by an application as an input that includes anything needed by the application to function, and a hash operation can be performed on the data item to generate the hash. A create authentication signature API 616 can use an internal asymmetric signing key to perform a digital signing operation on the input data to create the POO. To provide additional security with respect to POO creation, a public signing key can be used as an input to the hash operation.

A retrieve asymmetric session public key API 604 is performed to retrieve an asymmetric session public key. The asymmetric session public key can be used by an initiating cryptographic trust enabled device (e.g., device 110-1) for creating a pairing session with a session target cryptographic trust enabled device (e.g., device 110-N). To retrieve the asymmetric session public key, the API 604 can request the asymmetric session public key through a session initiation API 618. The API 618 can return a public portion of the key. This capability can be used as needed by the application, and can be used when exchanging public access as part of the multiple step process described with respect to the API 530.

An initialize primary asymmetric session API 606 can set up a first stage session between the initiating cryptographic enabled trust device and the session target cryptographic trust enabled device with a remote public key, as part of a multiple step process in conjunction with the API 604, a commit primary asymmetric session API 610, and a secondary asymmetric session API 612. When executed, the API 606 can place the initiating cryptographic enabled trust device in an elevated state (from a normal state) to begin the process of creating a shared session key paired with the session target cryptographic trust enabled device, and returning a random string of bits as an output. As will be described in further detail below, the random string of bits can be sent to a second asymmetric session API 612 to move to the next state in the pairing process.

A verify POO API 608 enables the verification of the POO (the POO created using the API 602) when the initiating and session target cryptographic trust devices are from the same issuing organization. To verify the POO, a set of data including POO signature bits and the initial data segment can be received, and verification of accuracy of the set of data can be performed to obtain a POO verification response that is signified by a status change internal to the initiating cryptographic trust enabled device. An asymmetric decryption API 620 can be used as part of this operation, which performs internal asymmetric decryption within protected memory to provide the POO verification response.

The commit primary asymmetric session API 610 can commit a primary asymmetric session between the initiating cryptographic enabled trust device and the session target cryptographic trust enabled device, upon the initiating cryptographic trust enabled device entering the elevated state (e.g., with respect to the API 606 or the API 612). The functionality performed with respect to the API 610 completes the multiple step process to create a full session key, which is a product of the operations on both the initiating cryptographic trust enabled device and the session target cryptographic trust enabled device. Both of the initiating and session target cryptographic trust enabled devices can be provisioned with the same session key, and the elevated state subsequently returns to a normal state. The verified POO can be optionally used to verify a remote cryptographic trust enabled device entering into the pairing, enabling a higher level of assurance of the authenticity for the cryptographic trust enabled devices.

A secondary asymmetric session API 612 can implement a secondary asymmetric session as part of the multiple step process in conjunction with the APIs 604, 606 and 610. When the API 612 is executed, the initiating cryptographic enabled trust device can be placed in an elevated state to begin the multiple step process of creating a shared session key paired with the session target cryptographic trust enabled device with respect to the primary asymmetric session initialization performed by the API 606.

A retrieve network public information API 614 can retrieve a public certificate for asymmetric sessions between two devices. The public certificate can enable increased security of legacy network communications as the public certificate can be provisioned and sequenced on the distributed ledger. To obtain the public certificate, the API 614 can request that the public certificate be returned using a retrieve network certificate API 622, and the API 622 can return the public certificate to satisfy the request. The origin of the public certificate can also be verified for certificate revocation operations.

Figure 7:
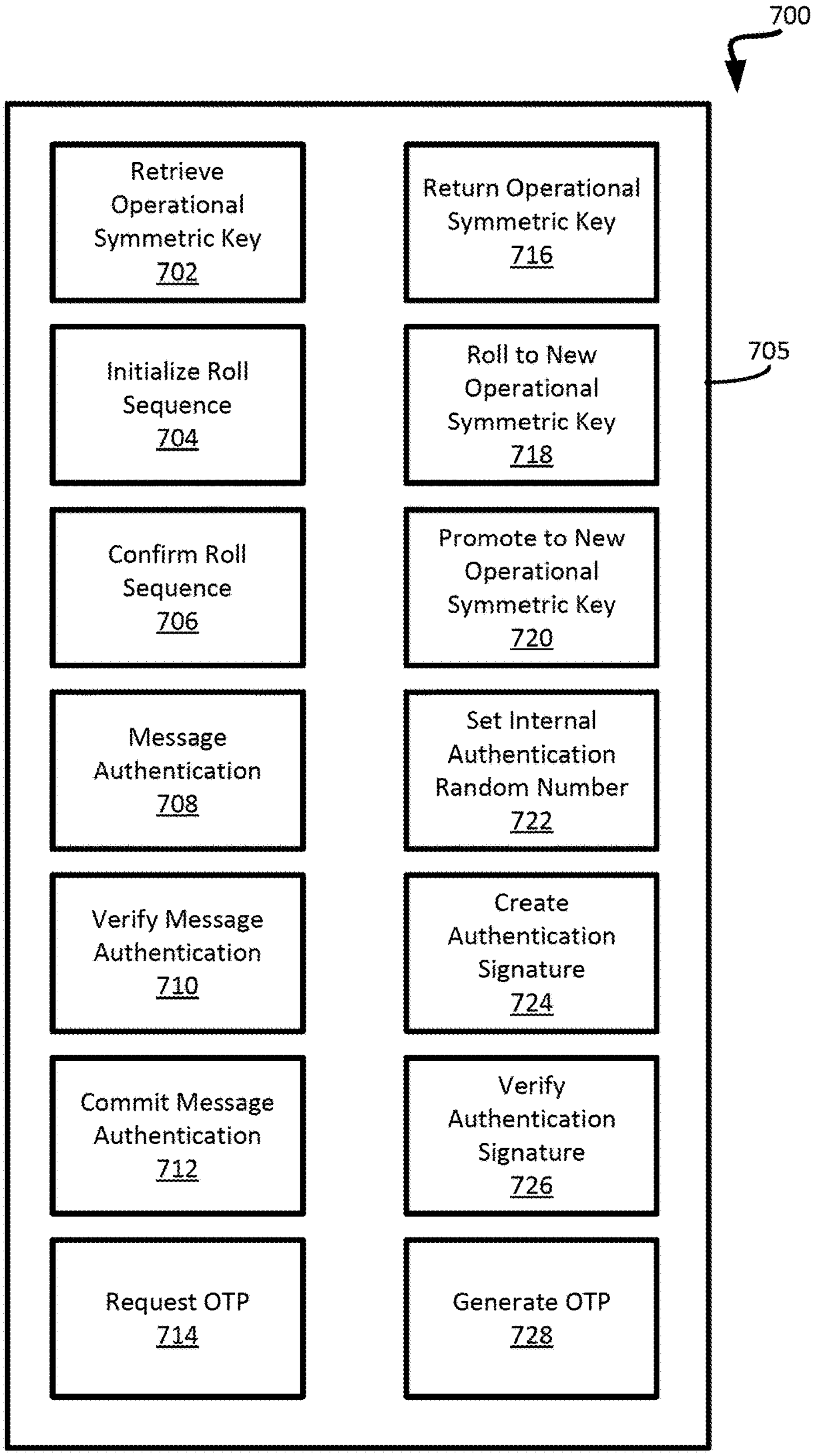
FIG. 7 is a block diagram of example symmetric application programming interface (API) methods implemented by a cryptographic enable trust device for enabling cybersecurity features, in accordance with some embodiments of the present disclosure.

FIG. 7 is a diagram 700 of symmetric API methods for enabling cybersecurity features, in accordance with some embodiments of the present disclosure. As shown, the diagram 700 includes an API library 705. The API library 705 can be maintained on a cryptographic trust enabled device. For example, the API library 705 can be similar to the API library 114 maintained on the device 110-1, as described above with reference to FIG. 1. In this example, the API library 705 maintains a number of APIs 702-728 that implement various symmetric API functionalities related to enabling cybersecurity features. Other devices (e.g., device 110-N) can maintain respective API libraries.

A retrieve operational symmetric key API 702 can retrieve an operational symmetric key. The operational symmetric key can be a one-time pad (OTP), which is generated and internally stored to support uniformly encrypted communications between similarly provisioned cryptographic trust enabled devices. To do so, the API 702 can request that the cryptographic enabled trust device provide a current operational symmetric key, and the current operational symmetric key can returned from the cryptographic trust enabled device through a return operating symmetric key API 716. This feature can be utilized for a network segment where all cryptographic enabled trust devices on the network segment could produce this same key and thus seamlessly communicate while encrypting all communications. Additionally or alternatively, this feature can be used on products, such that all products of the same model can utilize encrypted communications between a product and the secrets and service provider system (e.g. the secrets and service provider system 130 of FIG. 1). The API 702 can work in conjunction with an initialize roll sequence API 704 and a confirm roll sequence API 706, which can be used to updating a current operational symmetric key that can be retrieved by the API 702.

The initialize roll sequence API 704 can initiate a multiple stage process for updating the current operational symmetric key to a new operational symmetric key within a cryptographic trust enabled device. The multiple stage process starts by receiving a proper formatted roll token from a controller which supervises the network segment or product model targeted for a new symmetric operations key, and passing the roll token to the cryptographic trust enabled device. The receipt and verification of the roll token cause a "roll to new operational symmetric key" API 718 to temporarily elevate the status of the cryptographic trust enabled device to a supersession state. In the supersession state, both the new and old operational symmetric keys are present and usable. When the cryptographic enabled trust device is in the elevated state, the supersession process starts, and a verification sequence can be completed before a new roll sequence is started. The roll sequence does not end until successful completion of the functionality implemented by the API 606, or interruption of the roll sequence by internal or external processes.

As mentioned above, the API 706 can complete the roll sequence verification, which was initialized with respect to the API 704. The roll sequence verification is completed when a commit token having format that proves that the operation of both the old and new operational symmetric keys together is passed to the cryptographic enable trust device, and a "promote to new operational symmetric key" API 720 promotes the old operational symmetric key to the new operational symmetric key. The old operational symmetric key can then be purged from the memory of the cryptographic trust enabled device.

A message authentication API 708 can retrieve, using a "set internal authentication random number (RN)" API 722, a unique verification code for cryptographic trust enabled device to verify a data item. The verification code can be used to authenticate commands that are then verifiable by another cryptographic trust enabled device which has the same authentication secret. That is, the verification code can be designed for mutual authentication where both cryptographic enabled trust devices use a two-way handshake sequence in conjunction with a verify message authentication API 710.

The verify message authentication API 710 can be used with the message authentication API 708 to verify the message authentication by generating an authentication package. If the API 708 is implemented on a remote cryptographic trust enabled device that is calling the API 720 on a local cryptographic trust enabled device, then the API 708 that is calling a create authentication signature API 724 is utilized for the second part of the handshake on the local cryptographic trust enabled device, or vice versa. The sequence performed by the API 710 can also add a unique randomized input to the authentication sequence, similar to the API 708. The unique randomized input added to the authentication sequence can enable the local and remote cryptographic trust enabled devices to verify each other as part of the message sequence between the local and remote cryptographic trust enabled devices.

A commit message authentication API 712 can complete the message authentication sequence that started with respect to the message authentication API 708 by generating a verification package to commit the message authentication. More specifically, the commit message authentication API 712 can call a verify authentication signature API 726 to obtain finished verification content and gain a temporary key to decrypt the finished verification content.

A request OTP API 714 can be used with many different OTP generation modes that switch the internally used secrets within a cryptographic trust enabled device. An OTP generation mode can be chosen by selecting an operational secret, and then calling a "generate OTP" API 728 to generate an OTP. The OTP can be a temporary code used to authenticate source of data, verification of integrity, as a communication encryption key, or for any other cryptographic operational inputs. The OTP is related to the data and can be reproduced by the same data on a cryptographic trust enabled device which is provisioned for the same end-use segment or for uniform operation on the same product model.

Figure 8:
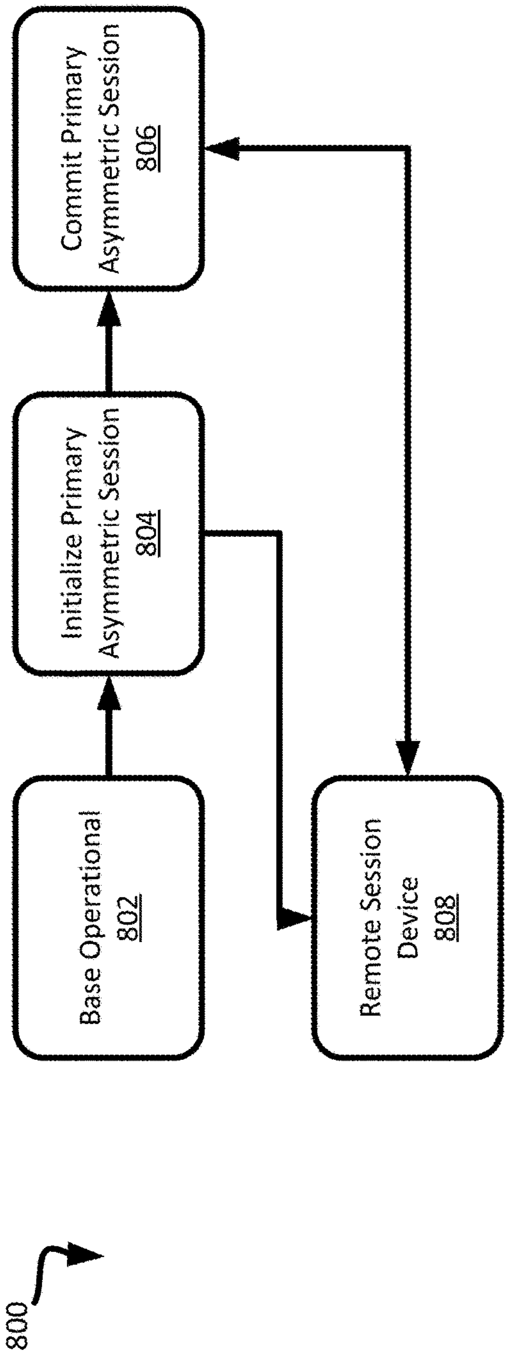
FIGS. 8-10 are block diagrams of example application programming interface (API) operational dependencies for enabling cybersecurity features, in accordance with some embodiments of the present disclosure.
Figure 9:
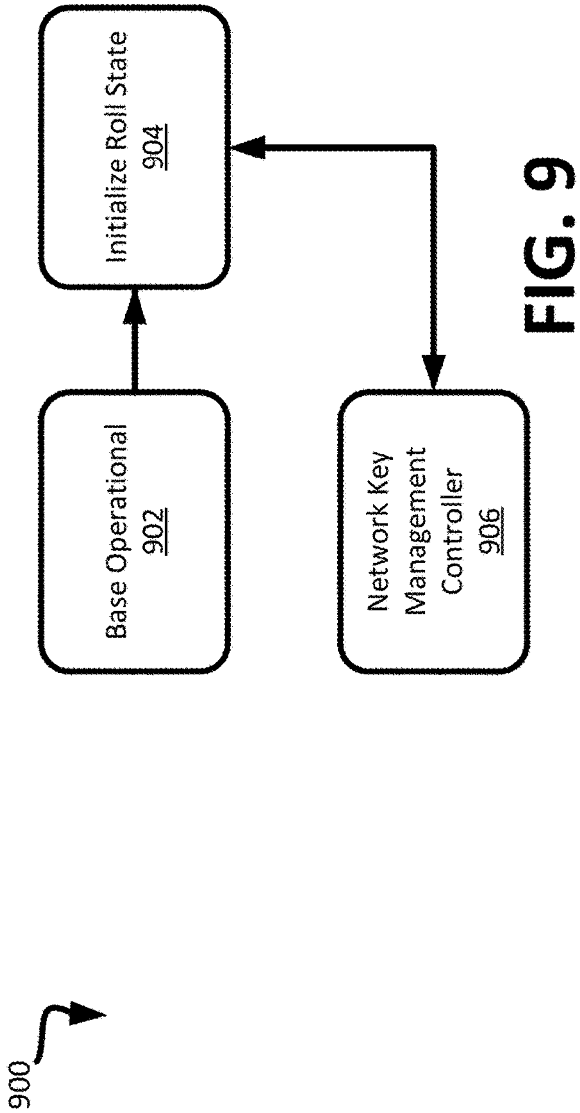
Figure 10:
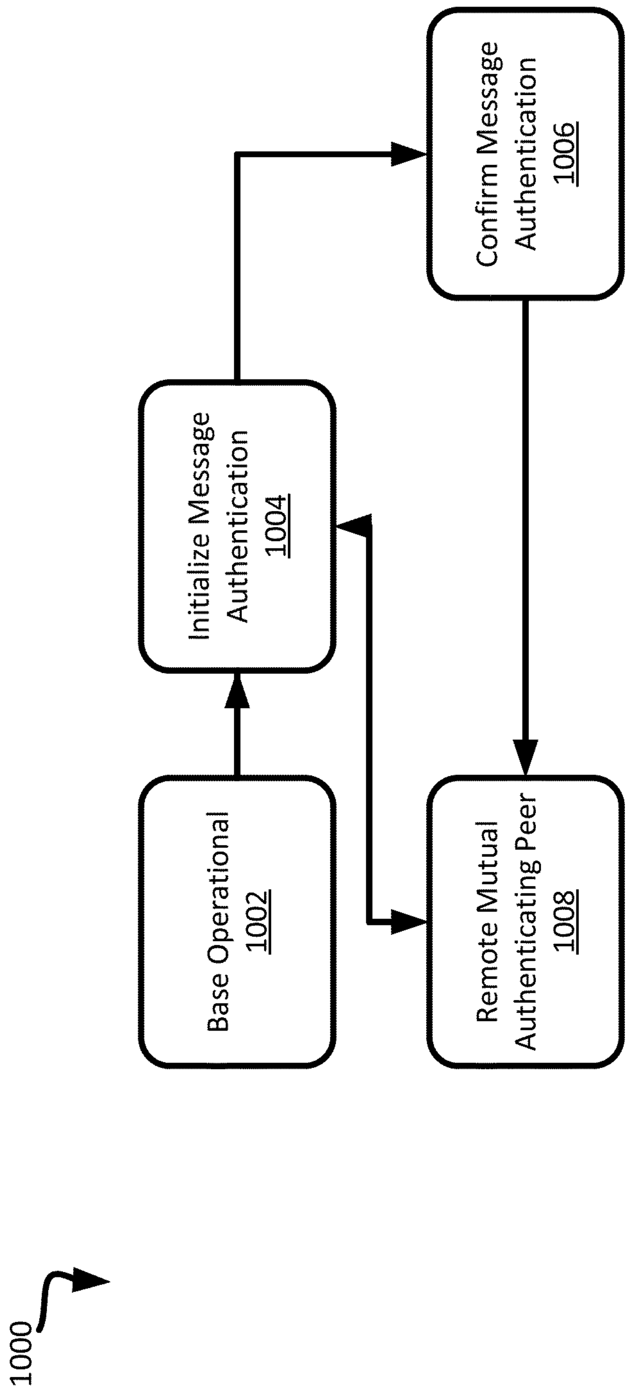

FIGS. 8-10 are diagrams of API operational dependencies for enabling cybersecurity features in accordance with some embodiments of the present disclosure. More specifically, FIGS. 8-10 illustrate multi-stage processes performed between a cryptographic trust enabled device ("device") and a secrets and service provider system (e.g., the device 110-1 and the secrets and service provider system 130 of FIG. 1) to change states of the device.

FIG. 8 illustrates a state progression sequence 800 for committing a primary asymmetric session. For example, the state progression sequence 800 can be used to implement a handshake protocol with respect to a remote session device. The state progression sequence 800 can start with the device being in a Base Operational state 802. While in the Base Operational state 802, a first set of API methods can be used for transitioning to an Initialize Primary Asymmetric Session state 804. For example, the first set of API methods can include "Create POO," "Verify POO," "Retrieve Asymmetric Session Public Key," "Initialize Primary Asymmetric Session," Secondary Asymmetric Session," and "Retrieve Network Public Information," as described above with reference to FIG. 6.

While in the Initialize Primary Asymmetric Session state 804, a second set of API methods can be used for transitioning to a Commit Primary Asymmetric Session state 806. For the example, the second set of methods can include "Commit Primary Asymmetric Session," "Secondary Asymmetric Session," and "Retrieve Network Public Information," as described above with reference to FIG. 6. A primary system session response can be sent to a remote session device 808.

Assuming that a timeout has not been received causing a reversion back to the Base Operational state 802, the progression sequence 800 transitions to the Commit Primary Asymmetric Session state 806. While in the Commit Primary Asymmetric Session state 806, a third set of API methods can be implemented. For example, the third set of API methods can include "Create POO," "Verify POO," and "Retrieve Network Public Information," as described above with reference to FIG. 6. A secondary system session response can be received from the remote session device 808. Communication can also be tested with the asymmetric session public key.

FIG. 9 illustrates a state progression sequence 900 for initializing a roll sequence. The state progression sequence 900 can start with the device being in a Base Operational state 902. While in the Base Operational state 902, a first set of API methods can be used for transitioning to an Initialize Roll of Derived Symmetric Operating Key state 904. For example, the first set of methods can include "Retrieve Symmetric Communication Key," "Initialize Roll Sequence," "Confirm Roll Sequence," "Initialize Message Authentication," "Commit Message Authentication," and "Generate OTP" as described above with reference to FIG. 7.

While in the Initialize Roll Sequence state 904, a second set of API methods can be used. For example, the second set of methods can include "Retrieve Symmetric Communication Key," "Initialize Roll Sequence," "Confirm Roll Sequence," "Message Authentication," "Verify Message Authentication," "Commit Message Authentication," and "Generate OTP" as described above with reference to FIG. 7. A network key management controller ("controller") 906 can provide a controller key roll token, receive a double symmetric key encrypted supersession token after providing the controller key roll token. In response to receiving the double symmetric key encrypted supersession token, the controller 906 can return a controller supersession commit token with a corresponding POO.

FIG. 10 illustrates a state progression sequence 1000 for confirming message authentication. The state progression sequence 1000 can start with the device being in a Base Operational state 1002. While in the Base Operational state 1002, a first set of API methods can be used for transitioning to an Initialize Message Authentication state 1004. For example, the first set of methods can include "Retrieve Operational Symmetric Key," "Initialize Roll Sequence," "Confirm Roll Sequence," "Message Authentication," "Commit Message Authentication," and "Generate OTP" as described above with reference to FIG. 7.

While in the Initialize Message Authentication state 1004, a second set of API methods can be used for transitioning to a Commit Message Authentication state 1006, assuming that a timeout has not been received to cause a reversion back to the Base Operational state 1002. For the example, the second set of API methods can include "Retrieve Symmetric Communication Key," "Verify Message Authentication," "Commit Message Authenticate," and "Generate OTP" as described above with reference to FIG. 6. A random number (RN) internally stored within the cryptographic trust enabled device can be sent to a remote mutual authenticating peer 1008. The RN can be optionally sent with a corresponding POO. Then, an authentication package can be received (optionally with the POO) from the remote mutual authenticating peer 1008.

While in the Commit Message Authentication state 1006, a third set of API methods can be used. For the example, the third set of API methods can include "Retrieve Operational Symmetric Key and "Generate OTP" as described above with reference to FIG. 7. A local authentication package can be sent (optionally with the POO) to the remote mutual authenticating peer 1008. If, at any point during the progression sequence 1000, a reversion occurs back to the Base Operational state 1002 (e.g., due to timeout), the RN internally stored within cryptographic trust enabled device can be deleted.

Figure 11:
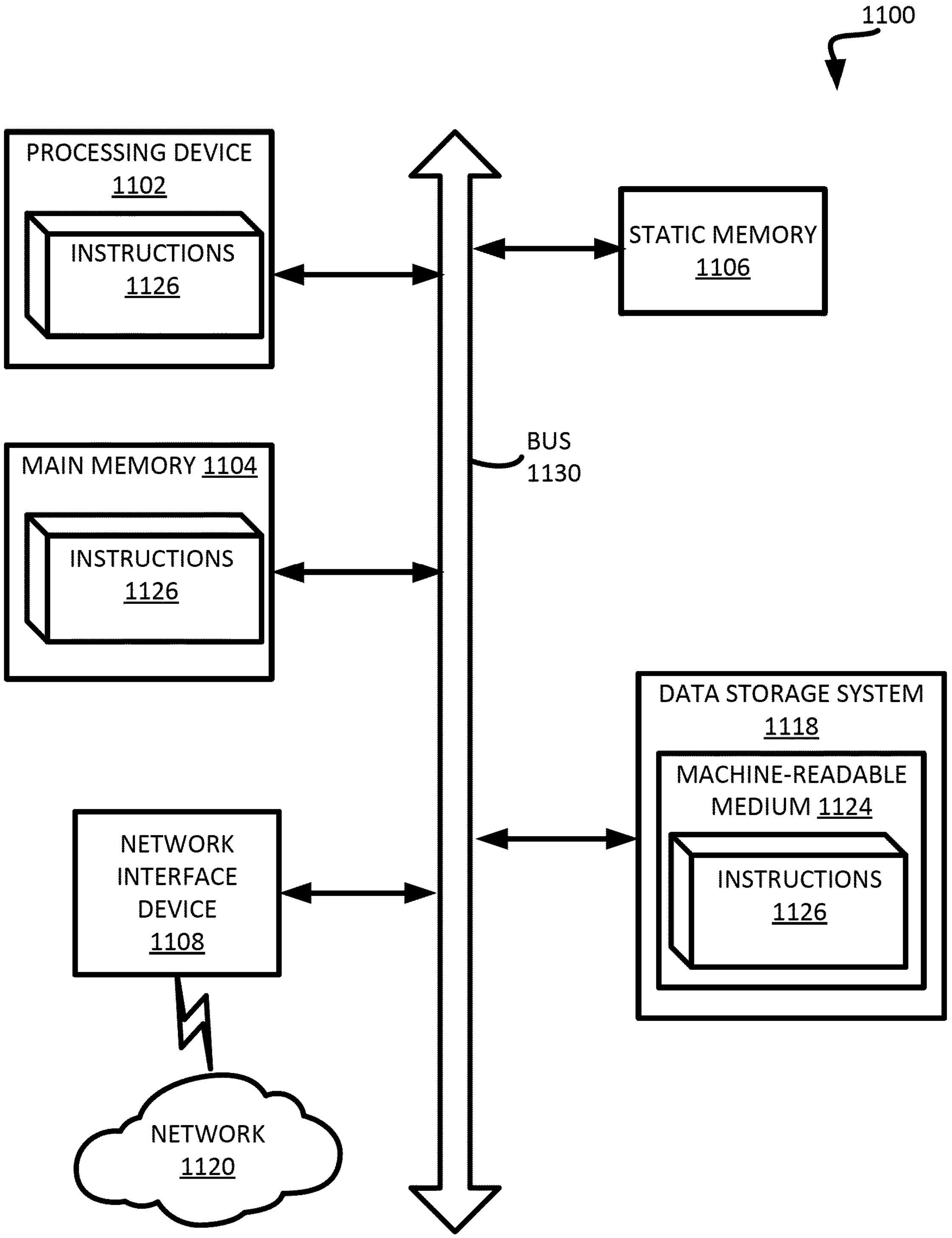
FIG. 11 is a block diagram of an example computer system in which embodiments of the present disclosure may operate.

FIG. 11 illustrates an example machine of a computer system 1100 within which a set of instructions, for causing the machine to perform any one or more of the methodologies discussed herein, can be executed. In some embodiments, the computer system 1100 can be implemented by a cryptographic enable trust device ("device") (e.g., the device 110-1 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) or RDRAM, etc.), a static memory 1106 (e.g., flash memory, static random access memory (SRAM), etc.), and a data storage system 1118, which communicate with each other via a bus 1130.

Processing device 1102 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1102 can also be one or more special-purpose processing devices such as an application specific integrated circuit (ASIC), a field programmable gate array (FPGA), a digital signal processor (DSP), network processor, or the like. The processing device 1102 is configured to execute instructions 1126 for performing the operations and steps discussed herein. The computer system 1100 can further include a network interface device 1108 to communicate over the network 1120.

The data storage system 1118 can include a machine-readable storage medium 1124 (also known as a computer-readable medium) on which is stored one or more sets of instructions 1126 or software embodying any one or more of the methodologies or functions described herein. The instructions 1126 can also reside, completely or at least partially, within the main memory 1104 and/or within the processing device 1102 during execution thereof by the computer system 1100, the main memory 1104 and the processing device 1102 also constituting machine-readable storage media.

In one embodiment, the instructions 1126 include instructions to implement functionality corresponding to cryptographic enabled trust device. While the machine-readable storage medium 1124 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a memory; and at least one processor, operatively coupled to the memory, to:

receive a permission to cause a transition to a target supply chain state of a device; and in response to receiving the permission to cause the transition to the target supply chain state, cause the transition to the target supply chain state, wherein, to cause the transition to the target supply chain state, the at least one processor is to:

cause a first set of secrets data, corresponding to the target supply chain state, to be stored in a protected memory; and cryptographically seal a second set of secrets data maintained in the protected memory, wherein the second set of secrets data corresponds to a previous supply chain state of the device.

2. The system of claim 1, wherein:

the target supply chain state is one of: a manufacturer provisioning state corresponding to a manufacturing stage of a supply chain associated with a manufacturer of the device, a vendor provisioning state corresponding to a vendor stage of the supply chain associated with a vendor in possession of the device, an end-use provisioning state corresponding to an end-use stage of the supply chain, or an operational state corresponding to an operational stage of the supply chain; and the first set of secrets data comprises at least one of: a set of manufacturer provisioning secrets, a set of vendor provisioning secrets, a set of end-use provisioning secrets, or a set of operational secrets.

3. The system of claim 1, wherein the at least one processor is further to:

receive a request to perform a cryptographic function utilizing the first set of secrets data; and generate a response to perform the cryptographic function in satisfaction of the request.

4. The system of claim 3, wherein:

the request comprises a request to perform at least one of: obtaining a single-use ephemeral key, obtaining a proof of origin for a data item, generating a session key to establish a paired device session, creating a digital proof of integrity for verifying a transferred message, generating a verification code to track supply chain asset security for a supply chain asset, implementing a security posture change, or tracking device trust; and the response comprises at least one of: the single-use ephemeral key, the proof of origin, the session key, the digital proof of integrity, the verification code, the security posture change, or a configuration sequence used to track device trust.

5. The system of claim 3, wherein:

the request comprises a request to perform at least one of: creating a proof of origin for a data item, retrieving an asymmetric session public key for creating a device pairing session, initializing a primary asymmetric session, verifying the proof of origin, committing the primary asymmetric session, implementing a secondary asymmetric session, or retrieving an asymmetric session public certificate; and the response comprises at least one of: an authentication signature to perform a digital signing operation to create the proof of origin, the asymmetric session public key, a set of data to initialize the primary asymmetric session generated based on the asymmetric session public key, a proof of origin verification generated using asymmetric decryption, a full session key to commit the primary asymmetric session, a secondary system session response and session key, or the asymmetric session public certificate.

6. The system of claim 3, wherein:

the request comprises a request to perform at least one of: retrieving an operational symmetric key, initializing a roll sequence to roll an old operational symmetric key to a new operational symmetric key, confirming the roll sequence, retrieving a verification code to perform message authentication, verifying the message authentication, committing the message authentication, or retrieving a one-time pad (OTP); and the response comprises at least one of: the operational symmetric key, initialization of the roll sequence, confirmation of the roll sequence and deletion of the old operational symmetric key, the verification code, an authentication package to verify the message authentication, a verification package to commit the message authentication, or the OTP.

7. The system of claim 1, wherein the at least one processor is further configured to receive an encrypted version of the first set of secrets data.

8. A method comprising:

receiving a permission to cause a transition to a target supply chain state of a device; and in response to receiving the permission to cause the transition to the target supply chain state, causing the transition to the target supply chain state, wherein causing the transition to the target supply chain state comprises:

causing a first set of secrets data, corresponding to the target supply chain state, to be stored in a protected memory; and cryptographically sealing a second set of secrets data maintained in the protected memory, wherein the second set of secrets data corresponds to a previous supply chain state of the device.

9. The method of claim 8, wherein:

the target supply chain state is one of: a manufacturer provisioning state corresponding to a manufacturing stage of a supply chain associated with a manufacturer of the device, a vendor provisioning state corresponding to a vendor stage of the supply chain associated with a vendor in possession of the device, an end-use provisioning state corresponding to an end-use stage of the supply chain, or an operational state corresponding to an operational stage of the supply chain; and the first set of secrets data comprises at least one of: a set of manufacturer provisioning secrets, a set of vendor provisioning secrets, a set of end-use provisioning secrets, or a set of operational secrets.

10. The method of claim 8, further comprising:

receiving a request to perform a cryptographic function utilizing the first set of secrets data; and generating a response to perform the cryptographic function in satisfaction of the request.

11. The method of claim 10, wherein:

the request comprises a request to perform at least one of: obtaining a single-use ephemeral key, obtaining a proof of origin for a data item, generating a session key to establish a paired device session, creating a digital proof of integrity for verifying a transferred message, generating a verification code to track supply chain asset security for a supply chain asset, implementing a security posture change, or tracking device trust; and the response comprises at least one of: the single-use ephemeral key, the proof of origin, the session key, the digital proof of integrity, the verification code, the security posture change, or a configuration sequence used to track device trust.

12. The method of claim 10, wherein:

the request comprises a request to perform at least one of: creating a proof of origin for a data item, retrieving an asymmetric session public key for creating a device pairing session, initializing a primary asymmetric session, verifying the proof of origin, committing the primary asymmetric session, implementing a secondary asymmetric session, or retrieving an asymmetric session public certificate; and the response comprises at least one of: an authentication signature to perform a digital signing operation to create the proof of origin, the asymmetric session public key, a set of data to initialize the primary asymmetric session generated based on the asymmetric session public key, a proof of origin verification generated using asymmetric decryption, a full session key to commit the primary asymmetric session, a secondary system session response and session key, or the asymmetric session public certificate.

13. The method of claim 10, wherein:

the request comprises a request to perform at least one of: retrieving an operational symmetric key, initializing a roll sequence to roll an old operational symmetric key to a new operational symmetric key, confirming the roll sequence, retrieving a verification code to perform message authentication, verifying the message authentication, committing the message authentication, or retrieving a one-time pad (OTP); and the response comprises at least one of: the operational symmetric key, initialization of the roll sequence, confirmation of the roll sequence and deletion of the old operational symmetric key, the verification code, an authentication package to verify the message authentication, a verification package to commit the message authentication, or the OTP.

14. The method of claim 8, further comprising receiving an encrypted version of the first set of secrets data.

15. A non-transitory computer-readable storage medium comprising instructions that, when executed by a processing device, cause the processing device to perform operations comprising:

receiving an encrypted version of a first set of secrets data corresponding to a target supply chain state of a device;

receiving a permission to cause a transition to the target supply chain state; and in response to receiving the permission to cause the transition to the target supply chain state, causing the transition to the target supply chain state, wherein causing the transition to the target supply chain state comprises:

causing the first set of secrets data to be stored in a protected memory; and cryptographically sealing a second set of secrets data maintained in the protected memory, wherein the second set of secrets data corresponds to a previous supply chain state of the device.

16. The non-transitory computer-readable storage medium of claim 15, wherein:

the state of the device is selected from the group consisting of: a manufacturer provisioning state corresponding to a manufacturing stage of a supply chain associated with a manufacturer of the device, a vendor provisioning state corresponding to a vendor stage of the supply chain associated with a vendor in possession of the device, an end-use provisioning state corresponding to an end-use stage of the supply chain, and an operational state corresponding to an operational stage of the supply chain; and the first set of secrets data comprises at least one of: a set of manufacturer provisioning secrets, a set of vendor provisioning secrets, a set of end-use provisioning secrets, or a set of operational secrets.

17. The non-transitory computer-readable storage medium of claim 15, wherein the operations further comprise:

receiving a request to perform a cryptographic function utilizing the first set of secrets data; and generating a response to perform the cryptographic function in satisfaction of the request.

18. The non-transitory computer-readable storage medium of claim 17, wherein:

the request comprises a request to perform at least one of: obtaining a single-use ephemeral key, obtaining a proof of origin for a data item, generating a session key to establish a paired device session, creating a digital proof of integrity for verifying a transferred message, generating a verification code to track supply chain asset security for a supply chain asset, implementing a security posture change, or tracking device trust; and the response comprises at least one of: the single-use ephemeral key, the proof of origin, the session key, the digital proof of integrity, the verification code, the security posture change, or a configuration sequence used to track device trust.

19. The non-transitory computer-readable storage medium of claim 17, wherein:

the request comprises a request to perform at least one of: creating a proof of origin for a data item, retrieving an asymmetric session public key for creating a device pairing session, initializing a primary asymmetric session, verifying the proof of origin, committing the primary asymmetric session, implementing a secondary asymmetric session, or retrieving an asymmetric session public certificate; and the response comprises at least one of: an authentication signature to perform a digital signing operation to create the proof of origin, the asymmetric session public key, a set of data to initialize the primary asymmetric session generated based on the asymmetric session public key, a proof of origin verification generated using asymmetric decryption, a full session key to commit the primary asymmetric session, a secondary system session response and session key, or the asymmetric session public certificate.

20. The non-transitory computer-readable storage medium of claim 17, wherein:

the request comprises a request to perform at least one of: retrieving an operational symmetric key, initializing a roll sequence to roll an old operational symmetric key to a new operational symmetric key, confirming the roll sequence, retrieving a verification code to perform message authentication, verifying the message authentication, committing the message authentication, or retrieving a one-time pad (OTP); and the response comprises at least one of: the operational symmetric key, initialization of the roll sequence, confirmation of the roll sequence and deletion of the old operational symmetric key, the verification code, an authentication package to verify the message authentication, a verification package to commit the message authentication, or the OTP.

* * * * *